US009927857B2

(12) United States Patent
Song et al.

(10) Patent No.: US 9,927,857 B2
(45) Date of Patent: Mar. 27, 2018

(54) PROFILING A JOB POWER AND ENERGY CONSUMPTION FOR A DATA PROCESSING SYSTEM

(71) Applicant: Intel Corporation, Santa Clara, CA (US)

(72) Inventors: Justin J. Song, Olympia, WA (US); Devadatta V. (Deva) Bodas, Federal Way, WA (US); Muralidhar (Murali) Rajappa, Chandler, AZ (US); Andy Hoffman, Olympia, WA (US); James W. (Jimbo) Alexander, Hillsboro, OR (US); Joseph A. Schaefer, Beaverton, OR (US); Sunil K. Mahawar, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 14/582,756

(22) Filed: Dec. 24, 2014

(65) Prior Publication Data

US 2016/0054774 A1 Feb. 25, 2016

Related U.S. Application Data

(60) Provisional application No. 62/040,576, filed on Aug. 22, 2014.

(51) Int. Cl.
*G06F 1/32* (2006.01)
*H04L 12/24* (2006.01)
(Continued)

(52) U.S. Cl.
CPC .......... *G06F 1/3203* (2013.01); *G05B 15/02* (2013.01); *G06F 1/30* (2013.01); *G06F 1/329* (2013.01); *G06F 1/3209* (2013.01); *G06F 1/3228* (2013.01); *G06F 1/3234* (2013.01); *G06F 1/3296* (2013.01); *G06F 9/4881* (2013.01); *G06F 9/4893* (2013.01); *G06F 9/5094* (2013.01); *G06Q 50/06* (2013.01);
(Continued)

(58) Field of Classification Search
CPC ..................................................... G06F 1/3203
See application file for complete search history.

(56) References Cited

U.S. PATENT DOCUMENTS

| 5,388,265 A | 2/1995 | Volk |
| 5,598,537 A | 1/1997 | Swanstrom et al. |

(Continued)

FOREIGN PATENT DOCUMENTS

| WO | WO 2002/019078 | 3/2002 |
| WO | WO 2004/070619 | 8/2004 |

(Continued)

OTHER PUBLICATIONS

Activity Monitor Demystified, Skvorc, 2012.*

(Continued)

*Primary Examiner* — Charlie Sun
(74) *Attorney, Agent, or Firm* — Womble Bond Dickinson (US) LLP

(57) ABSTRACT

A process identifier for a job is collected. The job runs on a plurality of nodes. The job is identified using the process identifier. A node for the job is identified. An amount of power consumed by the node to run the job is determined.

22 Claims, 10 Drawing Sheets

(51) Int. Cl.
| | | |
|---|---|---|
| *G05B 15/02* | (2006.01) | |
| *G06F 1/30* | (2006.01) | |
| *G06Q 50/06* | (2012.01) | |
| *G06F 9/48* | (2006.01) | |
| *H04L 12/911* | (2013.01) | |
| *G06F 9/50* | (2006.01) | |

(52) U.S. Cl.
CPC ........ *H04L 41/0833* (2013.01); *H04L 47/783* (2013.01); *H04L 47/821* (2013.01); *Y02B 60/142* (2013.01)

(56) References Cited

U.S. PATENT DOCUMENTS

| | | | |
|---|---|---|---|
| 5,752,050 A | 5/1998 | Hernandez et al. | |
| 5,784,628 A | 7/1998 | Reneris | |
| 5,842,027 A | 11/1998 | Oprescu et al. | |
| 5,905,900 A | 5/1999 | Combs et al. | |
| 6,125,450 A | 9/2000 | Kardach | |
| 6,745,335 B1 | 6/2004 | Kusano | |
| 6,760,852 B1 | 7/2004 | Gulick | |
| 6,971,033 B2 | 11/2005 | Ma | |
| 7,028,200 B2 | 4/2006 | Ma | |
| 7,111,179 B1 | 9/2006 | Girson et al. | |
| 7,143,300 B2 | 11/2006 | Potter et al. | |
| 7,861,068 B2 | 12/2010 | Gorbatov et al. | |
| 8,001,403 B2 | 8/2011 | Hamilton et al. | |
| 8,060,762 B2 | 11/2011 | Banginwar et al. | |
| 8,336,056 B1* | 12/2012 | Gadir | G06F 9/5027 718/100 |
| 2002/0194251 A1* | 12/2002 | Richter | G06F 9/5011 718/105 |
| 2003/0041272 A1 | 2/2003 | Nguyen | |
| 2003/0126240 A1 | 7/2003 | Vosseler | |
| 2003/0163745 A1 | 8/2003 | Kardach | |
| 2003/0221026 A1 | 11/2003 | Newman | |
| 2004/0022225 A1 | 2/2004 | Liang et al. | |
| 2004/0025063 A1 | 2/2004 | Riley | |
| 2005/0113103 A1 | 5/2005 | Snowden et al. | |
| 2005/0136961 A1 | 6/2005 | Simonsson et al. | |
| 2005/0138438 A1 | 6/2005 | Bodas | |
| 2005/0273633 A1 | 12/2005 | Wilcox et al. | |
| 2007/0240160 A1* | 10/2007 | Paterson-Jones | G06F 9/5055 718/104 |
| 2007/0245161 A1 | 10/2007 | Shaw et al. | |
| 2008/0104428 A1 | 5/2008 | Naffziger | |
| 2008/0178019 A1 | 7/2008 | McGrane et al. | |
| 2008/0209243 A1 | 8/2008 | Ghiasi et al. | |
| 2008/0222434 A1 | 9/2008 | Shimizu et al. | |
| 2008/0301475 A1 | 12/2008 | Felter | |
| 2009/0049313 A1 | 2/2009 | Gooding et al. | |
| 2009/0083746 A1 | 3/2009 | Katsumata et al. | |
| 2009/0113221 A1 | 4/2009 | Holle et al. | |
| 2009/0138219 A1 | 5/2009 | Bletsch et al. | |
| 2009/0254660 A1 | 10/2009 | Hanson et al. | |
| 2009/0265568 A1* | 10/2009 | Jackson | G06F 1/3203 713/320 |
| 2009/0271046 A1 | 10/2009 | Lewis | |
| 2010/0106985 A1 | 4/2010 | Panguluri et al. | |
| 2010/0205469 A1 | 8/2010 | McCarthy et al. | |
| 2010/0235840 A1 | 9/2010 | Angaluri | |
| 2010/0257531 A1* | 10/2010 | Barsness | G06F 9/4893 718/102 |
| 2010/0313203 A1 | 12/2010 | Dawson | |
| 2011/0022857 A1 | 1/2011 | Nussbaum et al. | |
| 2011/0022868 A1 | 1/2011 | Harchol-Balter et al. | |
| 2011/0161696 A1 | 6/2011 | Fletcher | |
| 2011/0167425 A1* | 7/2011 | Lurie | G06F 9/5072 718/102 |
| 2011/0178652 A1 | 7/2011 | Carter et al. | |
| 2011/0271283 A1 | 11/2011 | Bell, Jr. et al. | |
| 2012/0005683 A1 | 1/2012 | Bower, III et al. | |
| 2012/0054512 A1* | 3/2012 | Archibald | G06F 1/26 713/320 |
| 2012/0060170 A1 | 3/2012 | Vajda | |
| 2012/0072745 A1 | 3/2012 | Ahluwalia et al. | |
| 2012/0084580 A1 | 4/2012 | Harchol-Balter et al. | |
| 2012/0165963 A1 | 6/2012 | Kim et al. | |
| 2012/0216205 A1 | 8/2012 | Bell, Jr. et al. | |
| 2012/0324264 A1 | 12/2012 | Hanson et al. | |
| 2013/0103968 A1 | 4/2013 | Conroy et al. | |
| 2013/0124885 A1 | 5/2013 | Davis et al. | |
| 2013/0139172 A1* | 5/2013 | An | G06F 9/5005 718/104 |
| 2013/0185576 A1 | 7/2013 | Brundridge et al. | |
| 2013/0212410 A1 | 8/2013 | Li et al. | |
| 2013/0227557 A1 | 8/2013 | Pechanec et al. | |
| 2013/0339776 A1 | 12/2013 | Jagadishprasad et al. | |
| 2014/0006534 A1 | 1/2014 | Jain | |
| 2014/0059556 A1 | 2/2014 | Barsness et al. | |
| 2014/0075222 A1 | 3/2014 | Jackson | |
| 2014/0075448 A1 | 3/2014 | Bell, Jr. et al. | |
| 2014/0114107 A1 | 4/2014 | Gami | |
| 2014/0137121 A1 | 5/2014 | Asakura et al. | |
| 2014/0149768 A1 | 5/2014 | Kansal et al. | |
| 2014/0214107 A1 | 7/2014 | Gandhi et al. | |
| 2014/0245054 A1 | 8/2014 | Hamdi et al. | |
| 2014/0282425 A1* | 9/2014 | Zhao | G06F 11/3688 717/127 |
| 2014/0317635 A1 | 10/2014 | Konno | |
| 2015/0067693 A1 | 3/2015 | Yamazaki | |
| 2015/0169026 A1 | 6/2015 | Bodas et al. | |
| 2015/0177814 A1 | 6/2015 | Bailey et al. | |
| 2015/0248312 A1 | 9/2015 | Brochard et al. | |
| 2016/0011914 A1 | 1/2016 | Bohn et al. | |

FOREIGN PATENT DOCUMENTS

| | | |
|---|---|---|
| WO | WO 2006/007146 | 1/2006 |
| WO | WO 2013/172816 | 11/2013 |
| WO | WO 2014-053610 A1 | 4/2014 |

OTHER PUBLICATIONS

Zhai et al., HaPPy: Hyperthread-aware Power Profiling Dynamically, 2014 USENIX Annual Technical Conference, Jun. 2014.*
Silberschatz et al, Operating System Concepts, 2013, John Wiley & Sons, Inc.*
Alvarruiz, F., de Alfonso, C., Caballer, M. And Hernández, V. 2012. An Energy Manager for High Performance Computer Clusters. ISPA '12 Proceedings of the 2012 IEEE 10th International Symposium on Parallel and Distributed Processing with Applications, pp. 231-238.
Bhattacharya, A. *Constraints and Techniques for Software Power Management in Production Clusters.* Technical Report No. UCB/EECS-2013-110, Electrical Engineering and Computer Sciences, University of California at Berkeley, May 17, 2013, total 72 pages. http://www.eecs.berkeley.edu/Pubs/TechRpts/2013/EECS-2013-110.pdf.
Brehm, M. 2013. *Energy Aware Scheduling SuperMUC@ LRZ.* Application Support Group. Leibniz Supercomputing Centre, total 7 pages. http://www.autotune-project.eu/system/files/Matthias_Brehm_Energietag.pdf.
Cai, C., Wang, L., Khan, S. and Tao, J. 2011. Energy-aware High Performance Computing—A Taxonomy Study. Parallel and Distributed Systems (ICPADS), 2011 IEEE 17th International Conference on. (Tainan, Taiwan. Dec. 7, 2009), pp. 953-958.
Department of Energy. 2013. CORAL procurement benchmarks. LLNL-PRE-637694. (May 31, 2013), total 15 pages. https://asc.llnl.gov/CORAL-benchmarks/CORALBenchmarksProcedure-v26.pdf.
Etinski, M., Corbalan, J. and Labarta, J. *Power-Aware Parallel Job Scheduling.* Barcelona Supercomputing Center, total 2 pages, downloaded from Internet on Jan. 26, 2015. http://nsfcac.rutgers.edu/GreenHPC/EEHiPC/eehipc_etinski.pdf.
HP, Intel, Microsoft, Phoenix, Toshiba, Dec. 6, 2011. *Advanced Configuration and Power Interface Specification Revision 5.0.*, total 958 pages. http://www.acpi.info/DOWNLOADS/ACPIspec50.pdf.

(56) References Cited

OTHER PUBLICATIONS

Intel® Corp. 2014. *Intel® 64 and IA-32 Architectures Software Developer Manuals.* vol. 2 (2A, 2B, & 2C), total 1,495 pages. http://www.intel.com/content/www/us/en/processors/architectures-software-developer-manuals.html.

Lefurgy, C., Allen-Ware, M., Carter, J., El-Essawy, W., Felter, W., Ferreira A., Huang, W., Hylick, A., Keller, T., Rajamani, K., Rawson F. and Rubio, J. 2011. Energy-Efficient Data Centers and Systems. 2011 IEEE International Symposium on Workload Characterization. (Austin, Texas. Nov. 6, 2011), total 214 pages. http://researcher.watson.ibm.com/researcher/files/us-lefurgy/EEDCS_tutorial_IISWC2011.pdf.

Mämmelä, O., Majanen, M., Basmadjian, R., De Meer, H., Giesler, A. and Homberg, W. Energy-aware job scheduler for high-performance computing. Computer Science—Research and Development27, No. 4 (2012): 265-275, published online: Aug. 31, 20111.

Matthieu, H. Power cappring in SLURM. Green days @ life, (Nov. 2013), total 27 pages.

Rountree, B., Ahn, D., de Supinski, B., Lowenthal, D. and Schulz, M. 2012. Beyond DVFS: A First Look at Performance Under a Hardware-Enforced Power Bound. *8th Workshop on High-Performance, Power-Aware Computing (HPPAC)*. (May 21, 2012), total 9 pages. http://e-reports-ext.llnl.gov/pdf/576372.pdf.

2013. *Slurm Workload Manager.* (Nov. 2013), total 2 pages. http://slurm.schedmd.com.

Yoo, A., Jette, M. and Grondona, M. 2003. SLURM:Simple Linux utility for resource management. In, Feitleson, D., Rudolph, L. and Schwiegelshohn, U. editors. Job Scheduling Strategies for Parallel Processing. 9th Springer Verlag International Workshop. JSSPP 2003 (Seattle Jun. 2003). Lect. Notes Comput. Sci. vol. 2862, pp. 44-60.

Zhou, Z., Lan, Z., Tang, W. and Desai, N., 2013. Reducing Energy Costs for IBM Blue Gene/P via Power-Aware Job Scheduling. Department of Computer Science, Illinois Institute of Technology; Mathematics and Computer Science Division, Argonne National Laboratory. JSSPP 2013, total 20 pages. http://www.cs.huji.ac.il/~feit/parsched/jsspp13/zhou.pdf.

PCT Notification of Transmittal of the International Search Report and the Written Opinion of the International Searching Authority or the Declaration for PCT Counterpart Application No. PCT/US2012/037812, 10 pgs., (dated Jan. 23, 2013).

PCT Notification concerning Transmittal of International Preliminary Report on Patentability (Chapter I of the Patent Cooperation Treaty) for PCT Counterpart Application No. PCT/US2012/037812, 7 pgs., (dated Nov. 27, 2014).

PCT Written Opinion of the International Searching Authority for PCT Counterpart Application No. PCT/US2012/038405 5 pgs., (dated Feb. 28, 2013).

PCT International Search Report and Written Opinion received for PCT Patent Application No. PCT/US2012/038405, dated May 17, 2012, 3 pages.

PCT Notification concerning Transmittal of International Preliminary Report on Patentability (Chapter I of the Patent Cooperation Treaty) for PCT Counterpart Application No. PCT/US2012/038405, 7 pgs., (dated Nov. 27, 2014).

First Office Action (and English translation) from CN Application No. 200410101227.1, dated Dec. 1, 2006, 27 pgs.

Office Action issued in U.S. Appl. No. 10/859,892, dated Jul. 25, 2006, 10 pgs.

Office Action issued in U.S. Appl. No. 10/859,892, dated Dec. 6, 2006, 9 pgs.

Abstract from W00219078, corresponding to reference CN 1449517A, 7 pgs.

Office Action from UK Patent Application No. 0425264.9, dated Sep. 22, 2006, 6 pgs.

Office Action from UK Patent Application No. 0609876.8, dated Sep. 22, 2006, 5 pgs.

Office Action from U.S. Appl. No. 10/871,638, dated Sep. 28, 2006, 13 pgs.

Deva Bodas, et al, "Simple Power-Aware Scheduler to Limit Power Consumption by HPC System within a Budget," Intel Corporation (U.S. Appl. No. 62/040, 576). 10 pages.

PCT International Search Report and Written Opinion received for PCT Patent Application No. PCT/US2012/036403, dated Sep. 4, 2015, 14 pages.

PCT International Search Report for Appln. No. PCT/US2015/036435, dated Sep. 18, 2015, 16 pages.

PCT International Search Report for Appln. No. PCT/US2015/036294, dated Sep. 25, 2015, 12 pages.

International Preliminary Report on Patentability for International Application No. PCT/US2015/036294, dated Mar. 9, 2017, 8 pgs.

* cited by examiner

1000

| Job Type → | Compute Intensive | Communication Intensive | Storage Intensive | Synthetic |
|---|---|---|---|---|
| CPU | 50% | 30% | 30% | 35% |
| DDR | 5% | 10% | 10% | 15% |
| Storage | 10% | 5% | 15% | 10% |
| Network | 10% | 20% | 10% | 10% |
| Rest of Node | 25% | 35% | 35% | 30% |

FIG. 10

PROFILING A JOB POWER AND ENERGY CONSUMPTION FOR A DATA PROCESSING SYSTEM

CROSS-REFERENCE TO RELATED APPLICATIONS

The present application claims the benefit of prior U.S. Provisional Patent Application No. 62/040,576, entitled "SIMPLE POWER-AWARE SCHEDULER TO LIMIT POWER CONSUMPTION BY HPC SYSTEM WITHIN A BUDGET" filed on Aug. 22, 2014, which is hereby incorporated by reference in its entirety.

The present application is related to the U.S. patent application Ser. No. 14/582,795 entitled METHODS AND APPARATUS TO ESTIMATE POWER PERFORMANCE OF A JOB THAT RUNS ON MULTIPLE NODES OF A DISTRIBUTED COMPUTER SYSTEM, filed Dec. 24, 2014; the U.S. patent application Ser. No. 14/582,783 entitled METHOD AND APPARATUS TO GENERATE AND USE POWER, THERMAL AND PERFORMANCE CHARACTERISTICS OF NODES TO IMPROVE ENERGY EFFICIENCY AND REDUCING WAIT TIME FOR JOBS IN THE QUEUE, filed Dec. 24, 2014; the U.S. patent application Ser. No. 14/582,979 entitled ADJUSTMENT OF EXECUTION OF TASKS, filed Dec. 24, 2014; the U.S. patent application Ser. No. 14/582,985 entitled CONTROL OF POWER CONSUMPTION, filed Dec. 24, 2014; the U.S. patent application Ser. No. 14/582,988 entitled FORECAST FOR DEMAND OF ENERGY, filed Dec. 24, 2014; the U.S. patent application Ser. No. 14/582,772 entitled METHODS AND APPARATUS TO MANAGE JOBS THAT CAN AND CANNOT BE SUSPENDED WHEN THERE IS A CHANGE IN POWER ALLOCATION TO A DISTRIBUTED COMPUTER SYSTEM, filed Dec. 24, 2014; the U.S. patent application Ser. No. 14/582,743 entitled MANAGING POWER PERFORMANCE OF DISTRIBUTED COMPUTING SYSTEMS, filed Dec. 24, 2014; and the U.S. patent application Ser. No. 14/582,764 entitled "A POWER AWARE JOB SCHEDULER AND MANAGER FOR A DATA PROCESSING SYSTEM", filed Dec. 24, 2014.

FIELD

Embodiments as described herein relate to a field of electronic device manufacturing, and in particular, to data processing systems.

BACKGROUND

Generally, a High Performance Computing (HPC) system performs parallel computing by simultaneous use of multiple nodes to execute a computational assignment referred to as a job. Each node typically includes processors, memory, operating system, and input-output (I/O) components. The nodes communicate with each other through a high speed network fabric and may use shared file systems or storage. The job is divided in thousands of parallel tasks distributed over thousands of nodes. These tasks synchronize with each other hundreds of times a second. Usually an HPC system consumes megawatts of power.

Typically, HPC jobs run on a large number of compute nodes, IO nodes and operating system (OS) nodes. Typically, there are multiple HPC jobs in a single HPC cluster or HPC cloud. The jobs may share the same node at the same time. For example, the jobs may use the same non-volatile storage attached to the same IO node to save their private data. There is also tendency that a single compute node may serve more than one HPC jobs at a time.

Currently there is no technique to obtain the node power breakdown per job, indicating which portion of the node power belongs to which job. Traditionally, it is assumed that compute nodes are exclusively used by HPC jobs, which means that one single compute node can only serve one single HPC job at a time until this job is suspended or completed.

Conventional power monitoring techniques cannot be accurate as they do not provide per job power breakdown on the nodes. For example, for traditional in-house cluster based storage or network intensive HPC jobs, power monitoring inaccuracy can be as high as about 25%. If compute nodes are shared, power monitoring inaccuracy can add up to about 50%. For cloud based HPC or big data jobs, because substantially every node is shared and job scheduling is very dynamic, the conventional power monitoring result can be totally misleading.

BRIEF DESCRIPTION OF THE DRAWINGS

Embodiments of the invention may best be understood by referring to the following description and accompanying drawings that are used to illustrate embodiments of the invention. In the drawings:

FIG. 10 is a table showing exemplary weights of components on the nodes of the data processing system for different job types according to one embodiment.

DETAILED DESCRIPTION

Figure 1:
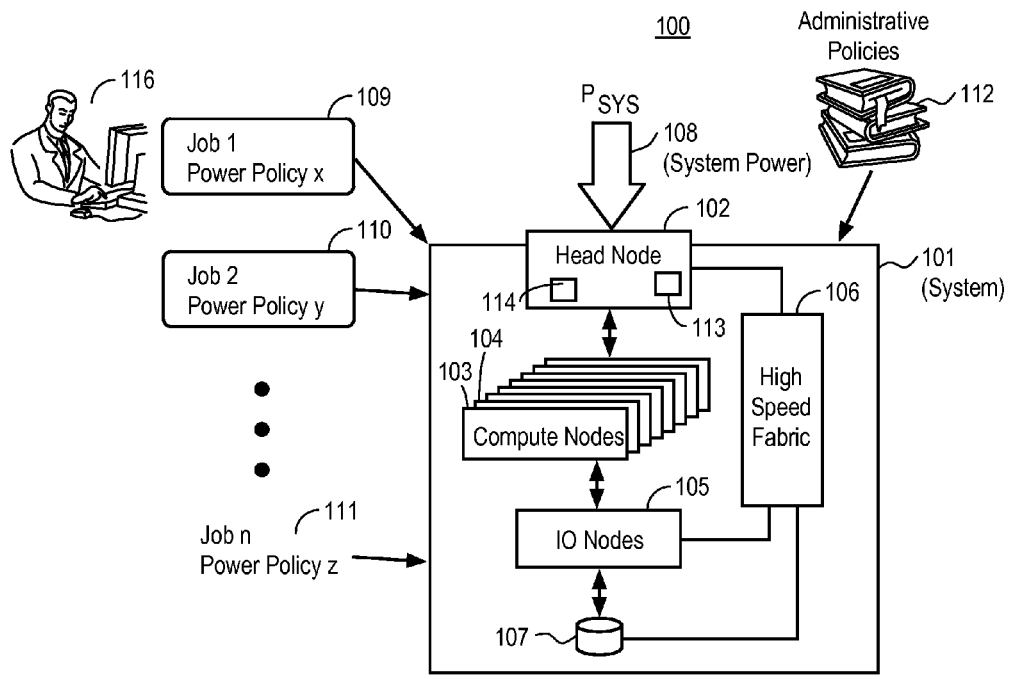
FIG. 1 a block diagram illustrating power inputs to a data processing system according to one embodiment.

Methods and apparatuses to profile power and energy consumption for a job running on multiple nodes and using shared resources in a distributed data processing system are described. Methods and apparatuses to provide a job power and energy consumption profiling described herein advantageously eliminate the existing power monitoring inaccuracy, reduce overhead, and are non-intrusive to jobs.

In one embodiment, a distributed data processing system comprises one or more shared nodes that provide services, computation, or both to multiple jobs at a time. Various techniques are identified to account for power of shared nodes to various jobs. This power along with power of non-shared nodes and overheads is aggregated to define power consumed by a job.

In one embodiment, the jobs that use shared nodes are tracked. The traffic and power of the shared nodes are measured. A global timestamp counter (TSC) is used to timestamp and sample one or more processes of the job running on one or more shared nodes. The sampling is used to determine which process is using the shared node. The traffic is correlated back to jobs using the shared nodes. Sampling is performed as frequently as needed to ensure counting accuracy. The sampling methods described herein are low overhead by nature.

In the following description, various aspects of the illustrative implementations will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative implementations. However, it will be apparent to one skilled in the art that the present invention may be practiced without the specific details. In other instances, well-known features are omitted or simplified in order not to obscure the illustrative implementations.

Various operations will be described as multiple discrete operations, in turn, in a manner that is most helpful in understanding the present invention, however, the order of description should not be construed to imply that these operations are necessarily order dependent. In particular, these operations need not be performed in the order of presentation.

While certain exemplary embodiments are described and shown in the accompanying drawings, it is to be understood that such embodiments are merely illustrative and not restrictive, and that the embodiments are not restricted to the specific constructions and arrangements shown and described because modifications may occur to those ordinarily skilled in the art.

Reference throughout the specification to "one embodiment", "another embodiment", or "an embodiment" means that a particular feature, structure, or characteristic described in connection with the embodiment is included in at least one embodiment. Thus, the appearance of the phrases, such as "one embodiment" and "an embodiment" in various places throughout the specification are not necessarily all referring to the same embodiment. Furthermore, the particular features, structures, or characteristics may be combined in any suitable manner in one or more embodiments.

Moreover, inventive aspects lie in less than all the features of a single disclosed embodiment. Thus, the claims following the Detailed Description are hereby expressly incorporated into this Detailed Description, with each claim standing on its own as a separate embodiment. While the exemplary embodiments have been described herein, those skilled in the art will recognize that these exemplary embodiments can be practiced with modification and alteration as described herein. The description is thus to be regarded as illustrative rather than limiting.

FIG. 1 a block diagram 100 illustrating power inputs to a data processing system 101 according to one embodiment.

The data processing system 101 comprises a plurality of nodes—e.g., one or more head nodes 102, one or more compute nodes, e.g., a compute node 103 and a compute node 104, one or more input-output (IO) nodes 105, one or more operating system (OS) nodes, and other nodes—coupled to a high speed fabric 106. In one embodiment, the compute nodes, such as compute nodes 103 and 104 are central processing unit (CPU) nodes. In one embodiment, head node 102 comprises one or more operating system (OS) nodes. The high-speed fabric may be a network topology of nodes interconnected via one or more switches. In one embodiment, each of the nodes, such as nodes 103, 104 and 105 comprises one or more processors, one or more controllers, or both coupled to a memory. Head node 102 comprises a resource manager having at least a portion of a power aware job scheduler and manager 113. In at least some embodiments, the resource manager is a distributed resource manager that runs on multiple nodes. In at least some embodiments, the resource manager runs on one or more OS nodes, one or more compute nodes, one or more IO nodes, or any combination thereof.

In one embodiment, head node 102 comprises a power monitor 114. In one embodiment, the power monitor is configured to collect a process identifier for a job. The job runs on a plurality of nodes. In one embodiment, the job comprises one or more threads (processes). The power monitor is configured to identify the job using the process identifier. The power monitor is configured to identify a node used by the job. The power monitor is configured to determine a power consumed by the job on the node, as described in further detail below.

In one embodiment, on a management node (e.g., head node 102) when a HPC job is spawned, a job identifier is created for the job. A plurality of nodes—e.g., compute nodes 103 and 104, IO nodes 105 and OS nodes—are allocated to the job. Generally, each compute node, IO node and OS node runs several threads (processes) for the job. The process identifiers for the job are sent from each compute node, IO node and OS node running the job back to the management node. A map between the job identifiers and the processes identifiers is created. In one embodiment, a start and a completion (end) of the job is time-stamped using a global timestamp counter for the system (e.g., a cluster timestamp counter, a cloud timestamp counter, or other system global timestamp counter). In one embodiment, the job start time and job completion time are stored in a memory on the management node.

In one embodiment, accesses to shared resources, e.g., IO and OS services on the IO and OS nodes are sampled and logged at a programmable frequency. The caller's (job's) process identifier and a global timestamp are also sampled and logged at the same time. The logged data are sent from the nodes running the job back to the management node of the HPC system. In one embodiment, the management node comprises a software module that is configured to use the logged data determine IO nodes and OS nodes' power breakdown per job using map between a job identifier to a process identifier, a job start time, job completion time and samples as described in further detail below.

In at least some embodiments, the job power and energy profiling as described herein is advantageously used by the power aware job scheduler and job manager to control a job power, to provide a job launching, run-time job power cap adjustment and regulation, so that the HPC job can advantageously deliver best performance and optimum throughput within power limits of the system. The power aware job scheduler and a job manager is described in a related U.S.

patent application Ser. No. 14/582,764 entitled "A Power Aware Job Scheduler And Manager For A Data Processing System" filed Dec. 24, 2014.

In one embodiment, head node 102 comprises a power estimator (not shown) described in the U.S. patent application Ser. No. 14/582,795 ENTITLED "METHODS AND APPARATUS TO ESTIMATE POWER PERFORMANCE OF A JOB THAT RUNS ON MULTIPLE NODES OF A DISTRIBUTED COMPUTER SYSTEM" FILED Dec. 24, 2014; and a power calibrator (not shown) described in the U.S. patent application Ser. No. 14/582,783 entitled "METHOD AND APPARATUS TO GENERATE AND USE POWER, THERMAL AND PERFORMANCE CHARACTERISTICS OF NODES TO IMPROVE ENERGY EFFICIENCY AND REDUCING WAIT TIME FOR JOBS IN THE QUEUE" filed Dec. 24, 2014. In one embodiment, one or more CPU nodes, such as CPU node 103 comprises a portion (not shown) of the power monitor stored in a memory. In one embodiment, one or more IO nodes 105 comprise a portion (not shown) of the power monitor stored in a memory.

A plurality of power inputs, such as inputs 108, 109, 110, 111 and one or more inputs 112 are provided to the system 101. Input 108 comprises data about a system power allocation (Psys). Input 109 comprise a power policy for a job X; input 110 comprises a power policy for a job Y, input 111 comprises a power policy for a job N from one or more users, such as a user 116. Input 112 comprises one or more administrative policies for a job, a data processing system, or both.

In one embodiment, high speed fabric 106 is a network, e.g., an Ethernet, an Omni-path, an InfiniBand, or other network. One or more IO nodes 105 are coupled to one or more storage nodes 107. The storage node 107 may comprise a non-persistent storage such as volatile memory (e.g., any type of random access memory "RAM"); a persistent storage such as non-volatile memory (e.g., read-only memory "ROM", power-backed RAM, flash memory, phase-change memory, etc.), a solid-state drive, a hard disk drive, an optical disc drive, a portable memory device, or any combination thereof.

In one embodiment, one or more storage nodes 107 are a part of the system 100. In another embodiment, the one or more storage nodes 107 are coupled to the one or more nodes 105 via a network. In one embodiment, system 100 is a HPC system. In another embodiment, system 100 is a cloud computing system. In one embodiment, system 100 is a HPC cluster system having thousands of nodes to run a job. In yet another embodiment, system 100 is an enterprise network system, or any other data processing system.

The head node 102 may provide a gateway to accessing the compute nodes, e.g., compute nodes 103 and 104. For example, prior to submitting a job for processing on the compute nodes, a user may be required to log-in to the system 100 which may be through the head node 102. In one embodiment, the head node 102 may accept jobs submitted by users and assist in the launching and managing of jobs being processed by the compute nodes.

In one embodiment, the compute nodes provide the bulk of the processing and computational power. The I/O nodes may provide an interface between the compute nodes and external devices (e.g., separate computers) that may provide input to the system 100 or receive output from the HPC system.

The system power allocation ($P_{sys}$) may be provided to the system 100 by, for example, a utility management facility (e.g., as determined by a system administrator or management software such as a datacenter manager). Typically, the $P_{sys}$ is used to run one or more of the jobs requested by one or more users. Each job includes a power policy to assist the system 100 in allocating power for the job and aid in the management of the one or more jobs being run by the system 100.

In addition, the administrative policies guide the management of running the jobs by providing an over-arching policy that defines the operation of the system 100. Examples of policies that may be included in the administrative policies 112 include, but are not limited or restricted to, (1) maximize utilization of all hardware and software resources (e.g., instead of running fewer jobs at high power and leaving resources unused, run as many jobs as possible to use as much of the resources as possible); (2) a job with no power limit is given the highest priority among all running jobs; and/or (3) suspended jobs are at higher priority for resumption. Such administrative policies govern the way the system 100 may schedule, launch, suspend and re-launch one or more jobs.

In one embodiment, a power availability for the system 100 is determined to reserve power for jobs that have started and cannot be suspended. The power aware scheduler is used to manage jobs with and without power limits. A power-aware scheduler is used to estimate the power required to run a job. Power-performance calibration of nodes is used to develop such an estimate. In one embodiment, the power estimate is determined based upon power-performance data collected on sample workloads or past runs of the job. Although the estimate may have a built-in guard band, actual power consumption of the job can be different. Job-level power monitoring assesses differences between the estimate and actual power consumption. Such assessments create opportunities to fine-tune power allocations to each job.

Generally, a power policy is a control mechanism used to ensure that the power consumed by a job stays within the job allocation. Power monitoring influences the power policy. Lack of power monitoring may need heavy power allocation guard bands so that the job will never consume more power than the allocation. This heavy allocation will need to be equal to or greater than the maximum power for a worst case workload.

Figure 2:
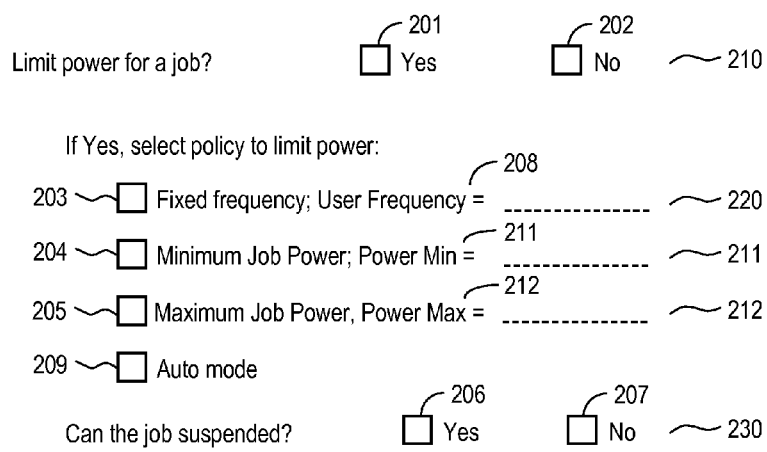
FIG. 2 is a view illustrating a user interface to provide user inputs to schedule a job according to one embodiment.

FIG. 2 is a view illustrating a user interface 200 to provide user inputs to schedule a job according to one embodiment. User inputs comprise a mode selection for a job. A mode selection for the job comprises an indication about whether the job is subjected to a power limit, an indication about a power limit policy for the job, an indication about a suspension policy for the job, or any combination thereof. The user interface 200 comprises a display area 210, 220 and 230. The display area 210 allows a user to designate whether the job is subjected to a power limit. As shown in FIG. 2, a selection "Yes" 201 indicates that the job has a power limit, and a selection "No" 202 indicates that the job does not have a power limit.

The display area 220 pertains to the selection of one of a predetermined power-limiting policy when the user permits the job to be subjected to power-limiting. A selection 203 indicates that the policy to limit power is a fixed frequency policy ("Fixed Frequency"), in which the user designates a particular frequency 208 at which the one or more nodes on which the job will run should operate. A selection 204 indicates that the policy is a minimum job power policy ("Minimum Power Mode") according to which the user designates a minimum power 211 to be supplied to the one or more nodes on which the job will run. A selection 205 indicates that the policy is a maximum job power policy ("Maximum Power Mode") according to which the user designates a maximum power 212 to be supplied to the one or more nodes on which the job will run. A selection 209 indicates that the policy is an auto mode ("Auto Mode") according to which the frequency at which the one or more nodes operate to run the job, the power supplied to the one or more nodes on which the job is running, or both can be dynamically adjusted based on a power allocation for a job, as described in further details in a related U.S. patent application Ser. No. 14/582,764 entitled "A Power Aware Job Scheduler And Manager For A Data Processing System" filed Dec. 12, 2014.

The display area 230 pertains to the selection of whether the job may be suspended during processing. A selection "Yes" 206 indicates that the job can be suspended. A selection "No" 207 indicates that the job cannot be suspended. In one embodiment, the job is suspended using one of job suspension techniques described in a related U.S. patent application Ser. No. 14/582,772 entitled "METHODS AND APPARATUS TO MANAGE JOBS THAT CAN AND CANNOT BE SUSPENDED WHEN THERE IS A CHANGE IN POWER ALLOCATION TO A DISTRIBUTED COMPUTER SYSTEM" filed Dec. 24, 2014.

A user interface screen is not the only method for a user to provide the data processing system 100 with input parameters such as, for example, a power policy, a minimum required frequency, a minimum required power, a maximum power and/or whether the job may be suspended. Alternatively, such parameters may be provided to the system 100 as part of the job submission and/or as a configuration file (e.g., a text file). In yet another embodiment, such parameters may be set by a system administrator, a facility manager/administrator and/or predetermined as part of a user's account with the system 100. In yet another embodiment, such parameters may be set using a job. For example, if the job, does not support check pointing, the job cannot be suspended.

Figure 3:
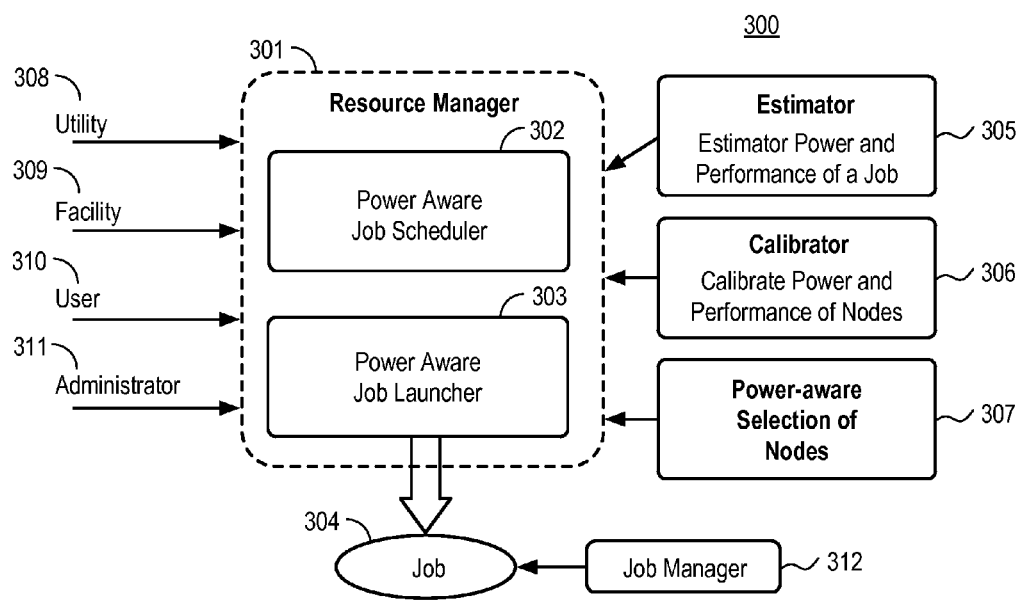
FIG. 3 is an exemplary block diagram of logic to provide power management according to one embodiment.

FIG. 3 is an exemplary block diagram of logic 300 to provide power management according to one embodiment. In one embodiment, a logic 300 is a part of the system 100. In one embodiment, logic 300 is a part of head node 102. The logic 300 comprises a resource manager 301 to schedule and launch jobs, a calibrator 306, an estimator 305, and one or more job managers 312. Resource manager 301 comprises a power aware job scheduler 302 coupled to a power aware job launcher 303. In one embodiment, the power aware job scheduler 302 coupled to the power aware job launcher 303 represent at least a portion of the power aware job scheduler and manager 113. In one embodiment, each job has a job manager. In one embodiment, resource manager 301 is a part of a head node, such as head node 102 depicted in FIG. 1. In one embodiment, power aware job scheduler 113 depicted in FIG. 1 represents at least a portion of the resource manager 301.

Resource manager 301 receives a plurality of inputs, e.g., one or more utility rules 308, one or more facility rules 309, a user policy input 310 and an administrator policy input 311, inputs from estimator 305, calibrator 306, and power aware selector of nodes 307.

Estimator 305 is configured to estimate power and performance of a job, e.g., job 304. The estimator 305 provides the resource manager 301 with estimates of power consumption for each job enabling the resource manager 301 to efficiently schedule and monitor each job requested by one or more job owners (e.g., users). The estimator 305 may provide a power consumption estimate based on, for example, maximum and average power values stored in a calibration database, wherein the calibration database is populated by the processing of the calibrator 306. In addition, the minimum power required for each job may be considered. Other factors that may be used by the estimator 305 to create a power consumption estimate include, but are not limited or restricted to, whether the owner of the job permits the job to be subject to a power limit, the job power policy limiting the power supplied to the job (e.g., a predetermined fixed frequency at which the job will run, a minimum power required for the job, or varying frequencies and/or power supplied determined by the resource manager 301), the startup power for the job, the frequency at which the job will run, the available power to the system 100, the allocated power to the system 100, or both. In one embodiment, estimator 305 represents one of estimators described in a related U.S. patent application Ser. No. 14/582,795 entitled "METHODS AND APPARATUS TO ESTIMATE POWER PERFORMANCE OF A JOB THAT RUNS ON MULTIPLE NODES OF A DISTRIBUTED COMPUTER SYSTEM" filed Dec. 24, 2014.

Calibrator 306 is configured to calibrate power and performance of nodes of the data processing system. The calibrator 306 calibrates the power, thermal dissipation and performance of each node within the data processing system 100. The calibrator 306 may provide a plurality of methods for calibrating the nodes within the HPC system 306. In one embodiment, the calibrator 306 may provide a method of calibration in which every node within the system 100 runs a sample workload (e.g., a mini-application and/or a test script) so the calibrator 306 may sample various parameters (e.g., power consumed) at predetermined time intervals to determine, for example, (1) the average power, (2) the maximum power, and (3) the minimum power for each node. In addition, the sample workload may be run on each node at every operating frequency of the node.

In another embodiment, the calibrator 306 may provide a method of calibration in which calibration of one or more nodes occurs during the run-time of a job. In such a situation, the calibrator 306 may sample the one or more nodes on which a job is running (e.g., processing). The calibrator 306 obtains power measurements of each node during actual run-time. In one embodiment, calibrator 306 represents one of power calibrators described in a related U.S. patent application Ser. No. 14/582,783 entitled "METHOD AND APPARATUS TO GENERATE AND USE POWER, THERMAL AND PERFORMANCE CHARACTERISTICS OF NODES TO IMPROVE ENERGY EFFICIENCY AND REDUCING WAIT TIME FOR JOBS IN THE QUEUE" filed Dec. 24, 2014.

Each job requested by a user (e.g., the owner of the job) is accompanied by a user policy input 310. The user policy includes at least a decision on whether the job 304 may be subjected to a power limit, if a power limit is permitted the policy to limit the power (e.g., a fixed frequency, minimum power required, or varying frequency and/or power determined by the resource manager 301), and whether the job 301 may be suspended, as described with respect to FIG. 2.

Power aware selector of nodes 307 is configured to select nodes to run a job, e.g., job 304. In alternative embodiments, power aware selector of nodes 307 selects nodes based on the job, e.g. a job power allocation, a job configuration parameter, a job communication latency, a distance, a number of hops of network switch, other criteria, or any combination thereof. For example, a user can specify how many cores, threads, or both are needed to run the job. For example, the user can state that the communication latency needs to be within a bound, such that the selected nodes needs to be within a limited distance (or hops of network fabric). Resource manager 301 uses power aware job scheduler 302 and power aware job launcher 303 to schedule and launch a job 304 based on the received inputs, e.g., one or more of the inputs 305, 306, 307, 308, 309, 310, 311. In one embodiment, the resource manager 301 is a software object that is responsible for allocation of compute and I/O resources for interactive and batch jobs that the users want to run. Typically, the resource manager 301 is also responsible for scheduling the jobs out of the job queue and launching the jobs to run as scheduled.

Generally, a user submits a program to be executed ("job") to a queue. The job queue refers to a data structure containing jobs to run. In one embodiment, the power aware job scheduler 302 examines the job queue at appropriate times (periodically or at certain events e.g., termination of previously running jobs) and determines if resources including the power needed to run the job can be allocated. In some cases, such resources can be allocated only at a future time, and in such cases the job is scheduled to run at a designated time in future.

When a job is scheduled to run, the job launcher 303 picks the job from the queue, and after determining that the appropriate resources (e.g., compute nodes, network, time) are allocated, the job launcher 303 spawns processes using the allocated resources to start the job in accordance with the inputs (e.g., job policy, power mode, and other input parameters) specified by the user. Job launcher 303 also can have a prologue and epilogue tasks that are performed prior to launching a job and upon termination of a job, respectively. The prologues and epilogues are used to set up the state of the computers and remove the states after the run.

A job manager 312 is configured to control job 304 to stay within an allocated power budget for the job. In one embodiment, job manager 312 is responsible for operating a job within the constraints of one or more power policies after the job has been launched. In one embodiment, job manager 312 is used to control power performance of all components (e.g., nodes, or other components) involved in execution of a job as per policies specified by at least one of the user and administrator.

Figure 4:
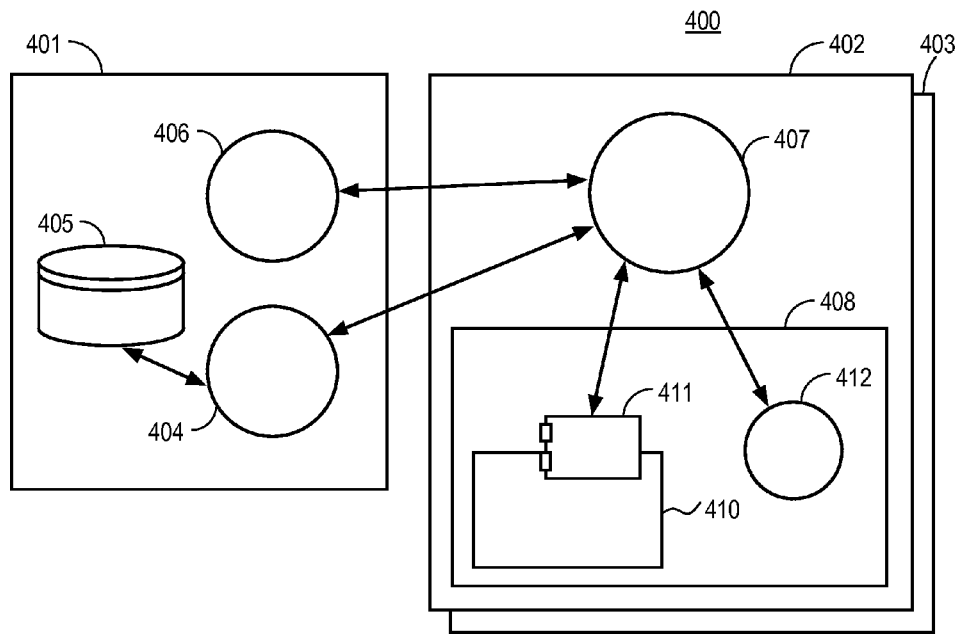
FIG. 4 is a block diagram illustrating a data processing system to manage a job using power monitoring information according to one embodiment.

FIG. 4 is a block diagram illustrating a data processing system 400 to manage a job using power monitoring information according to one embodiment. Data processing system 400 comprises a head node 401 coupled to one or more nodes, such as a node 402 and a node 403. In one embodiment, head node 401 represents head node 102. In one embodiment, node 402 is a compute node. In one embodiment, node 402 represents compute node 103. In another embodiment, node 102 is an IO node. In another embodiment, IO node 403 represents IO node 105. Head node 401 comprises a resource manager 406 coupled to a job manager 404. In one embodiment, head node 401 is a management controller node to provide a power aware job scheduler and manager.

Generally, each of the resource manager 406 and job manager 404 may be on the head node alone, or distributed over multiple nodes. In one embodiment, resource manager 406 represents resource manager 301. In one embodiment, job manager 404 represents a portion of job manager 312. In one embodiment, the resource manager 406 and job manager 404 are configured to collect job power data, as described in further detail below. In one embodiment, the resource manager 406 and job manager 404 are configured to collect job power data by reading sensors. In another embodiment, the resource manager 406 and job manager 404 are configured to collect job power data by reading from a database (e.g., database 405). In yet another embodiment, the resource manager 406 and job manager 404 use other parameters, e.g., utilization, bandwidth, power specifications, to develop an estimate for power consumption. In one embodiment, resource manager 406 comprises a power monitor—e.g., a program, such as a master daemon, an agent, other program, or any combination thereof—stored in a memory and executed by a processor to collect power data and to determine power consumption for a job using a job identifier and a power allocation information. In one embodiment, resource manager 406 is configured to sample processes on the nodes at a predetermined frequency to identify the process that runs at a current time, a number of nodes that run the job to determine a power distribution among jobs on a shared node. In one embodiment, resource manager 406 gathers power information using an Intelligent Platform Management Interface (IPMI) protocol. In one embodiment, job manager 404 accesses a job power database 405 to store or obtain the power information for a job. In one embodiment, job power database 405 is a part of head node 401. In another embodiment, job power database 405 is coupled to head node 401 via a network.

Node 402 comprises a job manager 407. Job manager 407 is coupled to job manager 404 and resource manager 406. Job data including a job power and a job frequency are communicated between job manager 404 and job manager 407. Other power data including a node power, network utilization, network bandwidth are communicated between job manager 407 and resource manager 406. In one embodiment, job manager 407 represents a portion of job manager 312. In one embodiment, each of job manager 404 and job manager 407 comprises an agent (e.g., an application, or any other computer program) stored in a memory and executed by a processor to report an input power, an output power, or both for a job. Job manager 407 is coupled to an interface 412 to obtain power data for a job. In one embodiment, the power data comprises a node power, a processor power and a memory power for a job. In one embodiment, interface 412 is an IPMI interface. Job manager 407 is coupled to a processor 410 via a storage device 411. In one embodiment, processor 410 is a CPU. In alternative embodiments, processor 410 is a graphics processing unit (GPU), a digital signal processor (DSP), or any other processor. In one embodiment, the processor frequency value is communicated between the job manager 407 and storage device 411. In one embodiment, storage device 411 comprises an operating system (OS) model specific register (MSR) module, or other storage device. In one embodiment, job manager 407 obtains and sets processor register values related to the processor frequency via the OS MSR module.

In one embodiment, when every node is used exclusively by one job, an agent located on each node (e.g., node 402) can report a node input power, a node output power, or both using an IPMI protocol to management node (e.g., head node 401). The node power is fetched by a HPC management daemon that is, for example, a part of job manager 407 and then sent to the management node. Another master daemon that is, for example, a part of resource manager 406 running on the management node collects the power data, and then uses job identifier and nodes allocation information for the job to determine power consumption for the job.

Figure 5:
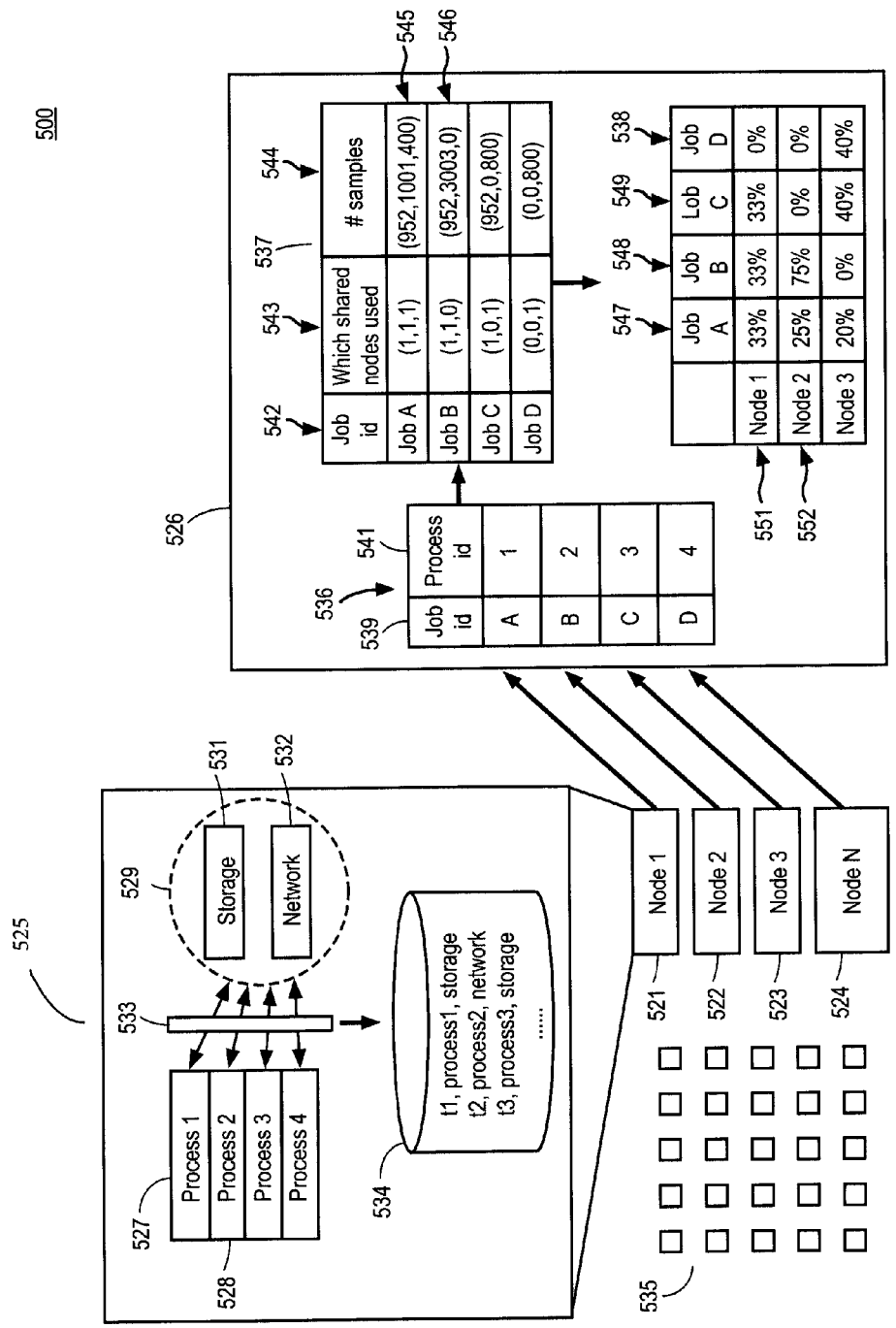
FIG. 5 shows a block diagram illustrating a data processing system to provide power monitoring according to one embodiment.

FIG. 5 shows a block diagram illustrating a data processing system 500 to provide power monitoring according to one embodiment. Data processing system 500 comprises a head node 526, a plurality of shared nodes—e.g., a node 521 (node 1), a node 522 (node 2), a node 523 (node 3), a node 524 (node N), and a plurality of exclusive nodes 535. In one embodiment, head node 526 represents a portion of one of head node 102 and head node 401. In one embodiment, head node 526 represents power monitor 114. In one embodiment, head node 526 is a management controller node. Each of the shared nodes is shared by a plurality of jobs. Each of the exclusive nodes 535 is used only by one job at a time. In one embodiment, the shared node 521 is an IO node. In another embodiment, shared node 521 is an OS node. In yet another embodiment, shared node 521 is a compute node. In alternative embodiments, the shared nodes are IO nodes, OS nodes, compute nodes, or any combination thereof. In alternative embodiments, the exclusive nodes are compute nodes, IO nodes, OS nodes, or any combination thereof.

In one embodiment, when jobs are not shared, the job power of the system is a sum of powers of all exclusive nodes running the jobs. When the job has some shared resources, the job power of the system is a sum of the powers of unshared resources and the powers on shared resources for the job determined using methods described herein.

As shown in an expanded view 525 of node 521, a plurality of job processes, such as a job process 527 and a job process 528 run on node 521. In one embodiment, the processes are tracked by head node 526. In one embodiment, a clock of the nodes (e.g., nodes 521, 522, 523, 524) is synchronized with a clock of the head node (e.g., head node 526) to provide a global time stamp counter (TSC). As shown in FIG. 5, the job processes access one or more shared resources 529, such as a storage 531 and a network 532 via an instrumentation layer 533. Instrumentation layer 533 is coupled to a database 534 to store job processes data. In one embodiment, instrumentation layer 533 is a thin layer created between callers (e.g., processes of HPC jobs) and callees (e.g., shared resources). In one embodiment, the instrumentation layer 533 is instrumented using shared resource access libraries. In one embodiment, the layer 533 provides through access to resources to minimize intrusiveness. When a sampling timer ticks, the layer 533 intercepts the caller's identifier (ID) and a current global timestamp, and stores the caller's identifier (ID) and the current global timestamp in database 534. Database 534 stores a current timestamp (t1, t2, t3, . . . tN) for a process, the process ID (process 1, process 2, process 3, process N), and a resource identifier used by the process. The data from each of the shared nodes databases (e.g., database 534) are sent at a predetermined programmable time to head node 526. The predetermined time can be e.g., every X milliseconds, where X can be any number. The lower the X, the more intrusive but more accurate the job power monitoring.

Head node 526 generates a table 536, a table 537 and a table 538 to calculate power breakdown. In one embodiment, table 536, table 537 and table 538 are stored in a memory that is a part of the head node 526. In another embodiment, table 536, table 537 and table 538 are stored in a memory coupled to the head node 526 via a network. Table 536 comprises a map between a job ID 536 and a process ID 541. For example, process 1 corresponds to Job A, process 2 corresponds to Job B, as shown in table 536.

Table 537 is generated using mapping from table 536. In one embodiment, the job identifier is looked up based on process identifiers to generate table 537. Table 537 indicates a usage of the node by a job and a number of accesses of each of the shared nodes by the job. A column 542 comprises an ID of the job. A column 543 comprises a bit map indicating the shared nodes used by the job. In one embodiment, numbers of times that the HPC jobs access to shared resources on the shared nodes are counted to create the bit map. A column 544 comprises a number of samples indicating how many times the job accessed each of the shared resources on the shared nodes.

As shown in table 537, a row 545 comprises a bit map (1, 1, 1) indicating that Job A used shared nodes 1, 2, and 3 and a number of samples (952, 1001, 400) indicating that Job A accessed shared resources on node 1 952 times, accessed shared resources on node 2 1001 times, and accessed shared resources on node 3 400 times. For example, row 546 comprises a bit map (1, 1, 0) indicating that Job B used shared nodes 1 and 2, and not used shared node 3 and a number of samples (952, 3003, 0) showing that Job B accessed shared resources on node 1 952 times, shared resources on node 2 3003 times, and did not access node 3.

Table 538 is generated using table 537. Table 538 indicates power portions of each of nodes used by each of jobs. In a non-limiting example, a column 547 shows that Job A uses 33% of power of Node 1, 25% of power of node 2, and 20% of power of node 3. A column 548 shows that Job B uses 33% of power of node 1, 75% of power of node 2, and 0% of power of node 3. A column 549 shows that Job C uses 33% of power of node 1; 0% of power of node 2, and 40% of power of node 3. In a non-limiting example, a row 551 shows that for node 1: 33% of power is used by Job A, 33% of power is used by Job B, 33% of power is used by Job C, and 0% of power is used by Job D. A row 552 shows that for node 2: 25% of power is used by Job A; 75% of power is used by Job B, 0% of power is used by Job C and 0% of power is used by Job D.

In one embodiment, each of the processes running a node is sampled. A power of the node at the sampling time is measured. The power for the process on the node is calculated as a sum of power readings of the samples of the process.

In another embodiment, total power consumed by each of the nodes is measured. For example, the total power consumed by each of the nodes is measured using IPMI tools, as described with respect to FIG. 4. The power consumption of each of the jobs is calculated using the total power consumed by each the nodes and the power portions of the nodes run by each of the jobs (e.g., the power portions of the nodes, as shown in table 538). For example, if the measured total power consumed by the node 1 is 3 KW, the power consumed by Job A is 3 KW×33%=0.99 KW, the power consumed by Job B is 3 KW×33%=0.99 KW, the power consumed by Job C is 3 KW×33%=0.99 KW, and the power consumed by Job D is 0.

In another embodiment, to account for power of shared jobs for IO nodes, a power for a unit of a shared node (e.g., storage, networking, or both) is established for a job. The established power indicates a portion of power needed for a shared node to transfer a predetermined amount (e.g., 1 KB) of data on a storage, network, or both for a job. A bandwidth of the shared node (e.g., storage, network) for the job is measured. For example, the bandwidth indicates a portion of the network traffic occupied by the job (e.g., 10%). The power portions consumed by the job on each of the shared nodes are calculated using the established power and the measured bandwidth for each shared node. For example, a storage node SN1 is shared by a job A, a job B and a job C. At a time interval T1, the node SN1 provides a 20% of bandwidth, data, or both to job A, a 65% of bandwidth, data, or both to Job B and 15% of bandwidth, data, or both to Job C. The power measured during the time interval T1 is charged in proportion with percentage use of bandwidth.

The total power consumed by the job is calculated as a sum of the power portions consumed by the job on each of the nodes.

In another embodiment, to account for power of jobs on shared (multi tenant) compute node, an average power consumed over a time unit for a node is measured. A timer is used to timestamp a usage of node by each process. The time of use of the node by each process is measured. The power consumed by each of the processes on the shared node is calculated by dividing the measured average power according to the time of use of the node by each of the processes. In this case, the total power used by the node is divided based upon time use of each process. For example, the total power used by the node is 1200 W. The portion of time usage of the node by process A (process A time portion) is 30%, process B time portion is 50%; and process C time portion is 20%. For this example, the node power used by process A is 360 W, the node power used by process B is 600 W, and the node power used by process C is 240 W. In reality, process A may be more power hungry and may consume more power than process B. Determining the process power for a process on a shared node according the process time does not take into account the actual power consumption by the process.

In yet another embodiment, to account for power for multiple processes running on the same node comprising a plurality of cores, a power consumed by a node is measured. A number of cores used by each of the processes is determined. For example, it is determined that process A is using 60 cores; process B is using 30 cores, and process C is using 20 cores. If the core power monitoring is not available, to determine the power consumed by each process, the measured power consumed by the node is divided based upon number of cores. If the core power monitoring is available, an actual core power for each core is used to calculate power consumed by the process.

Figure 6:
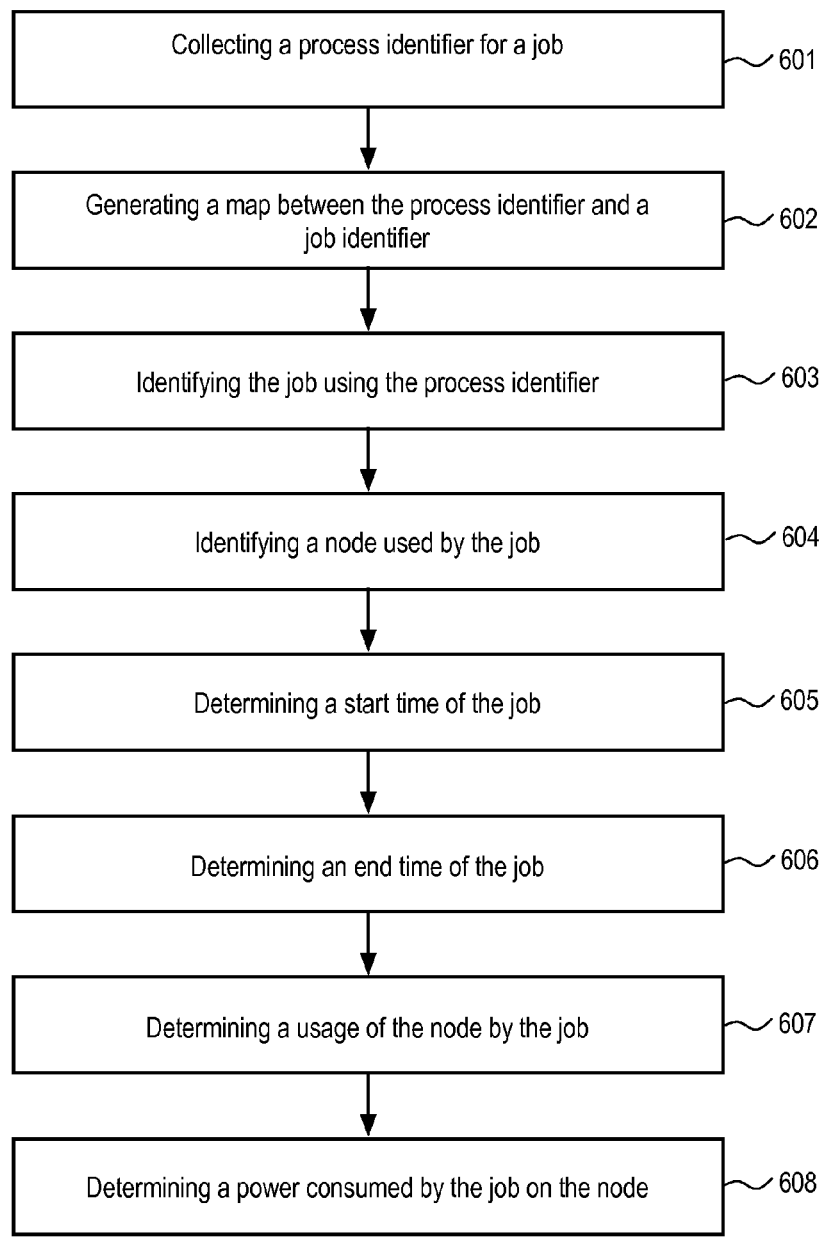
FIG. 6 is a flowchart of a method to profile a job power for a data processing system according to one embodiment.

FIG. 6 is a flowchart of a method 600 to profile a job power for a data processing system according to one embodiment. In one embodiment, method 600 is performed at a controller (manager) node, such as head node 526. In another embodiment, method 600 is performed at a node other than the head node, e.g., other OS node, or a compute node. At operation 601 a process identifier for a job is collected. In one embodiment, the job comprises one or more processes. At operation 602 a map between the process identifier and a job identifier is generated. In one embodiment, the map is a table, e.g., table 536. In another embodiment, the map between the process identifier and a job identifier is a data structure other than the table. At operation 603 the job is identified using the process identifier. In one embodiment, the job identifier is looked up on the map using the process identifier. At operation 604 a node used by the job is identified. In one embodiment, the node used by the job is identified from the process data provided by each of the nodes, as described above. At operation 605 a start time of the job is determined. In one embodiment, the start time of the job is determined from the process data provided by each of the nodes, as described above. At operation 606 an end time of the job is determined. In one embodiment, the end time of the job is determined from the process data provided by each of the nodes, as described above. At operation 607 a usage of the node by the job is determined. In one embodiment, a portion of the node used by the job is determined, as described above. In one embodiment, a shared resource used by the job is identified. In alternative embodiments, the shared resource is a network, a storage, a service provided by a node, or any combination thereof. At operation 608 a power consumed by the job on the node is determined. In one embodiment, a total power consumed by the node is measured, and the power consumed by the job on the node is calculated based on the measured total power and the portion of the node, as described above.

Figure 7:
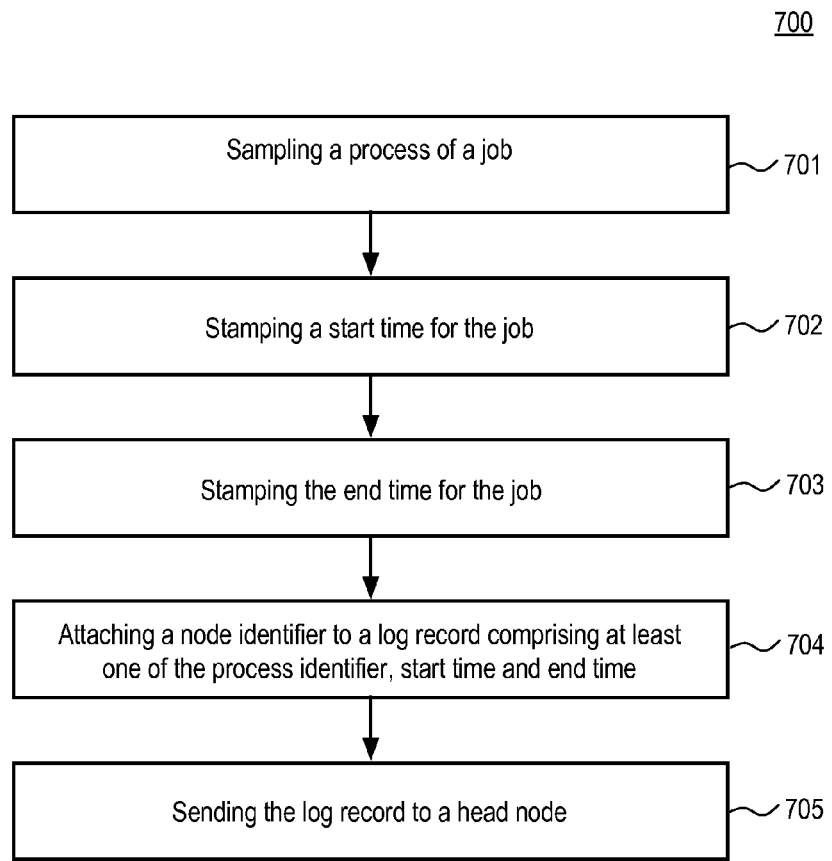
FIG. 7 is a flowchart of a method to profile a job power for a data processing system according to one embodiment.

FIG. 7 is a flowchart of a method 700 to profile a job power for a data processing system according to one embodiment. In one embodiment, method 700 is performed at each of the nodes, e.g., an OS node, an IO node, at a compute node that runs a job. At operation 701 a process of a job running on a plurality of nodes is sampled. In one embodiment, the job comprises one or more processes. In one embodiment, the process is sampled at a predetermined time. In one embodiment, sampling the process involves intercepting an access request from the process of the job. In one embodiment, a shared resource used by the process is identified using sampling. At operation 702 a start time for the job is stamped. At operation 703 an end time for the job is stamped. In one embodiment, a log record is created comprising the process ID, the process start time, the process end time, or any combination thereof. In one embodiment, the log record is stored in a database. At operation 704 a node identifier is attached to the log record. At operation 705 the log record having the attached node identifier is sent to a head node. In one embodiment, the log record having the attached node identifier is sent to the head node at a predetermined time, as described above.

Figure 8:
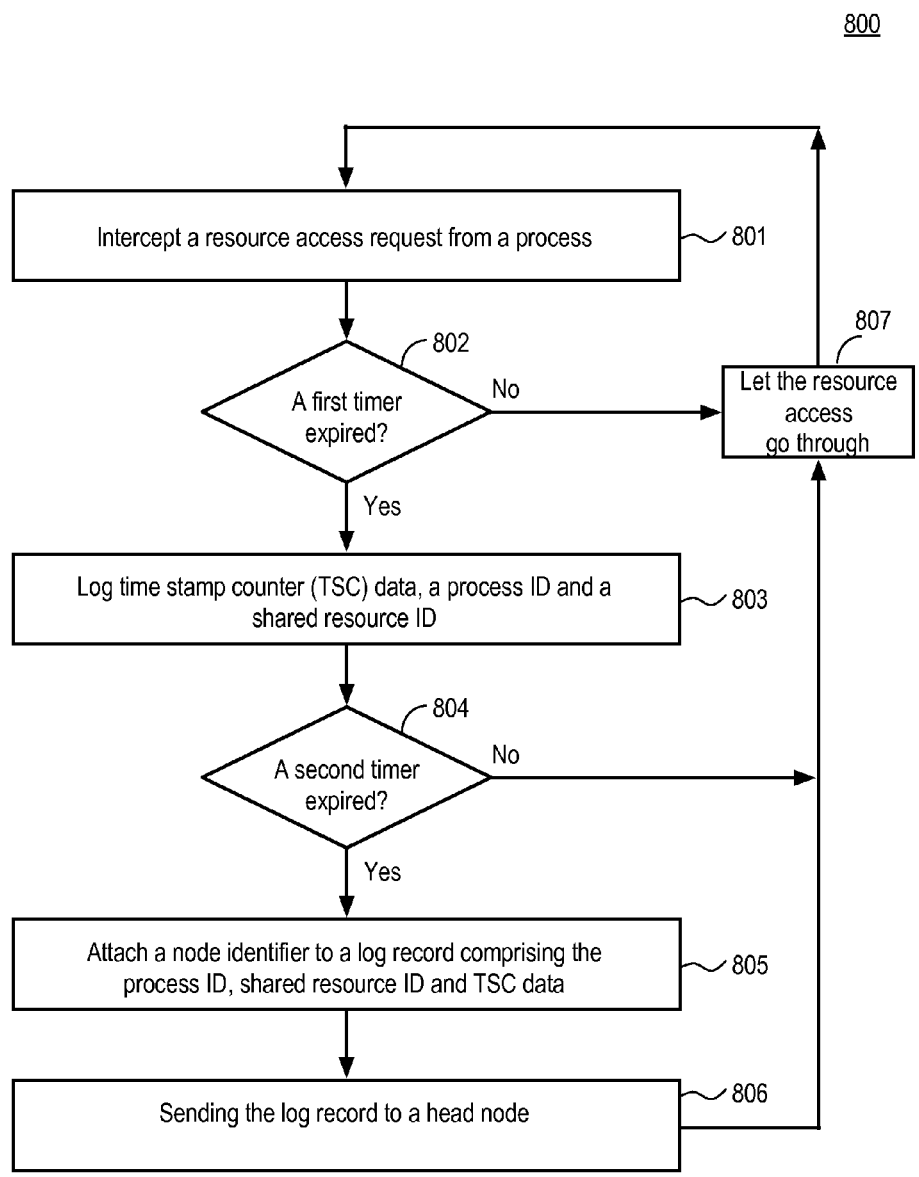
FIG. 8 is a flowchart of a method to profile a job power for a data processing system according to another embodiment.

FIG. 8 is a flowchart of a method 800 to profile a job power for a data processing system according to another embodiment. In one embodiment, method 800 is performed at each of the nodes that run a job, e.g., IO nodes, OS nodes, compute nodes. In one embodiment, method 800 is performed at each of the IO nodes. At operation 801 a resource access request from a process is intercepted. At operation 802 it is determined if a first timer expired. In one embodiment, the first timer is a sampling timer. In one embodiment, the first timer is an instrumentation sampling timer. In one embodiment, the first timer is expired every X milliseconds (ms), where X is configurable and can be any number. In one embodiment, an expiration time of the first timer is from about 1 ms to about 100 ms. If the first timer is not expired, the resource access request is not intercepted, and the resource access is let go through at operation 807, and method returns to operation 801. If the first timer is expired, the TSC data for the process, a process ID and a shared resource ID are logged in a database. In one embodiment, when the first timer is expired the instrumentation layer logs an IO access. At operation 804 it is determined if a second timer expired. In one embodiment, the second timer is a report-to-controller node timer that controls time of reporting the log data to a management node (e.g., head node 526). In one embodiment, the second timer is expired every Y seconds (s), where Y is configurable and can be any number. In one embodiment, an expiration time of the second timer Y is greater than the expiration time of the first timer X. In one embodiment, the expiration time of the second timer Y is about 100 times greater than the expiration time of the first timer X. In one embodiment, an expiration time of the second timer is from about 1 s to about 10 s. If the second timer is not expired, the resource access is let go through at operation 807, and method returns to operation 801. If the second timer is expired, a node identifier (ID) is attached to a log record comprising the process ID, shared resource ID and TSC data. In one embodiment, when the second timer is expired, the IO node sends the buffered log data to a controller (manager) node. At operation 806 the log record with the attached node ID is sent to a management node (e.g., head node 526). In one embodiment, the log record with the attached node ID is sent using a non-blocking application program interface (API).

Figure 9:
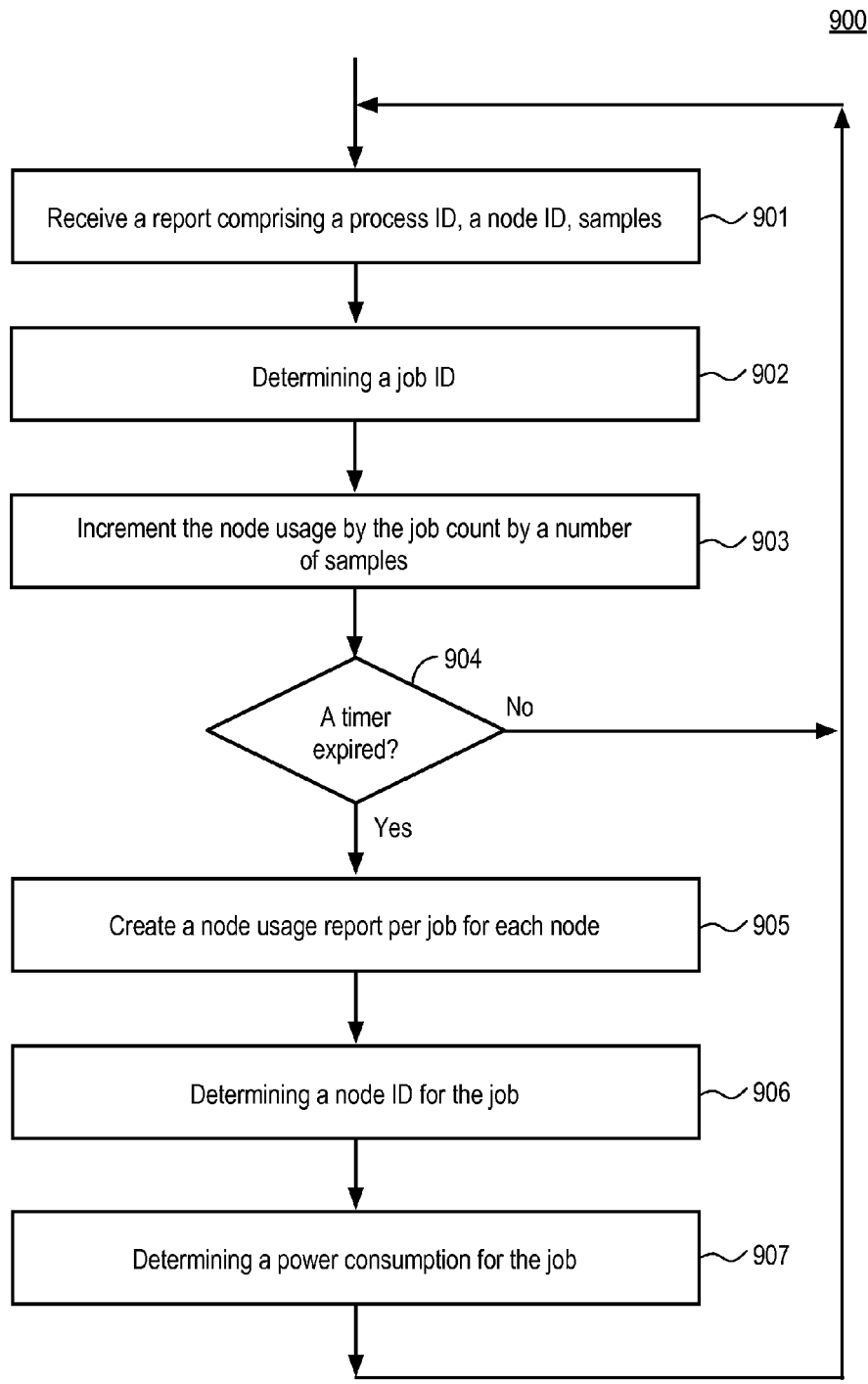
FIG. 9 is a flowchart of a method to profile a job power for a data processing system according to another embodiment.

FIG. 9 is a flowchart of a method 900 to profile a job power for a data processing system according to another embodiment. In one embodiment, method 900 is performed at a controller (manager) node, such as head node 526. In another embodiment, method 600 is performed at a node other than the head node, e.g., other OS node, or a compute node. At operation 901 a report comprising a process ID, a node ID, process samples, or any combination thereof is received. At operation 902 a job ID is determined using the process ID. In one embodiment, the job ID is determined using a map between a process ID and the job ID. In one embodiment, the job ID is looked up in a table mapping the job ID and process ID, such as table 536. In another embodiment, the job ID is looked up in a table mapping the job ID, process ID and node ID, e.g., table 537. At operation 903 a count of the usage of the node by the job is incremented by a number of samples. In one embodiment, the job IO usage count is incremented by a number of samples for the node. At operation 904 it is determined if a timer is expired. In one embodiment, the timer is a counting period timer. In one embodiment, an expiration time for the counting period timer can be any (Z) number of seconds, minutes, hours, or days and is configurable. If the timer is not expired, method 900 returns to operation 901. If the timer is expired, at operation 905 a node usage report per job is created for each node. In one embodiment, the node usage report per job for each node is created. In one embodiment, when the timer is expired, each node's usage report is created, and then summarized per job. In one embodiment, the node usage report comprises data indicating a usage of the node by a job and a number of accesses of each of the shared nodes by the job. In one embodiment, the node usage report comprises a table, such as table 537. In one embodiment, the node usage report comprises data indicating portions of each of jobs on each of nodes and portions of each of nodes run by each of jobs. In one embodiment, the node usage report comprises a table, such as tables 538. At operation 906 a node ID for each job is determined. In one embodiment, the node ID is determined using a map between the job ID and the node ID. In one embodiment, the node ID is looked up in a table mapping the job ID, the process ID and the node ID, such as table 537. At operation 907 a power consumption for the job is determined. In one embodiment, determining the power consumption for the job involves summarizing portions of the power consumptions of the job on each of the nodes that runs that job.

Figure 11:
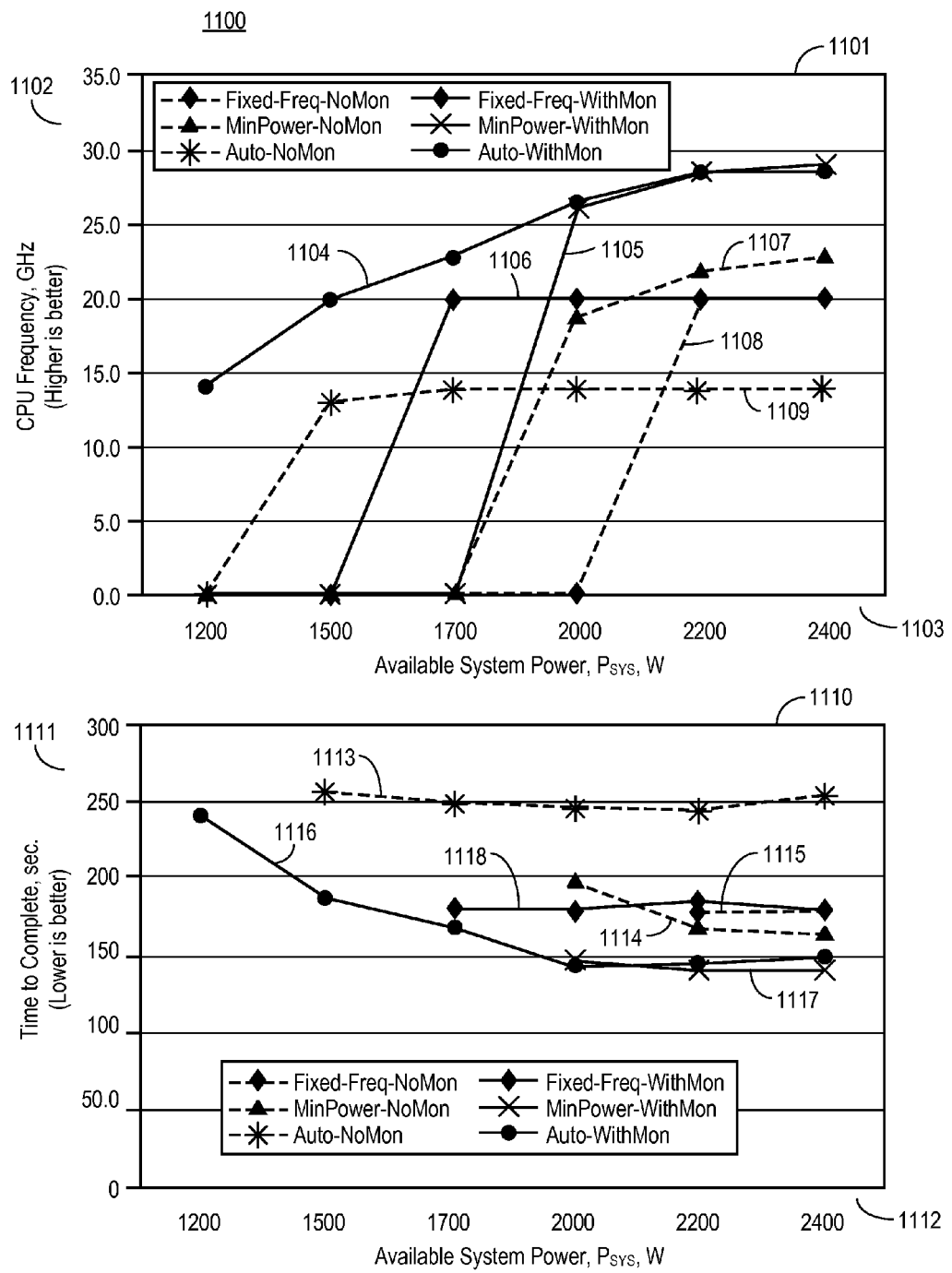
FIG. 11 shows an example of performance of the system with and without power monitoring according to one embodiment.

FIG. 10 is a table 1000 showing exemplary weights of components on the nodes of the data processing system for different job types according to one embodiment. Generally, different types of shared components have different power weights. As shown in FIG. 10, the power distribution among components of the node depends on a job type. Table 1000 shows typical weights for five different components, such as CPU, double data rate dynamic random-access memory (DDR), storage, network and rest of node (RON) shown in a column 1001, for four typical HPC jobs, such as a compute intensive job 1001, a communication intensive job 1003, a storage intensive job 1004, and a synthetic job 1005. In one embodiment, power of each of these components is measured separately, and the job power monitoring for each of the components is performed using sampling. Based on the weights and a number of samples, the management and controller node (e.g., head node 526) calculates the shared node power breakdown for jobs, as described above. The job power monitoring is performed on fine granularity (e.g. every X milli-seconds). The job power monitoring seamlessly works with the job power launcher and run time job manager, as described above. FIG. 11 shows an example of performance of the system with and without power monitoring according to one embodiment. A fixed frequency mode, a minimal power mode and an auto mode were used to choose uniform frequencies for a job. A graph 1101 shows a CPU frequency 1102 for a job versus an available system power (Psys) 1103 with and without power monitoring. A graph 1110 shows a time to complete a job 1111 versus an available system power (Psys) 1112 with and without power monitoring. Because performance is measured as the wall clock time to complete the job, the lower the number, the better the performance. The solid lines 1104, 1105, and 1106 show the CPU frequency with monitoring and the dotted lines 1107, 1108, and 1109 show the CPU frequency without monitoring. The solid lines 1116, 1117, and 1118 show the time to complete the job with monitoring and the dotted lines 1113, 1114, and 1115 show the time to complete the job without monitoring.

As shown in graphs 1110 and 1101, the resource manager gets better performance with power monitoring at all power limits in all modes. The benefit can be up to 40%. The auto mode enables a job to start at the lowest available power compared to the fixed frequency and minimal power modes. An automatic uniform frequency adjustment in auto mode maximizes use of available power. The job in the auto mode can operate at the uniform frequency which is about 40% higher than the frequency in a fixed frequency mode. Additionally, the solid lines in all three cases start closer to the Y-Axis than the corresponding dotted lines. This indicates that monitoring enables the scheduler to start jobs with lower system power limits.

As described above, the power of the shared systems is monitored. Monitoring of the power consumed by a job on the shared node is advantageously used to dynamically allocate power for a job to maximize system performance. If the power consumed by the job on the shared node is not monitored, this power acts as a reserved power and cannot be used for a dynamic power allocation. Typically, in the system from about 20% to about 40% of power is consumed by shared resources.

Figure 12:
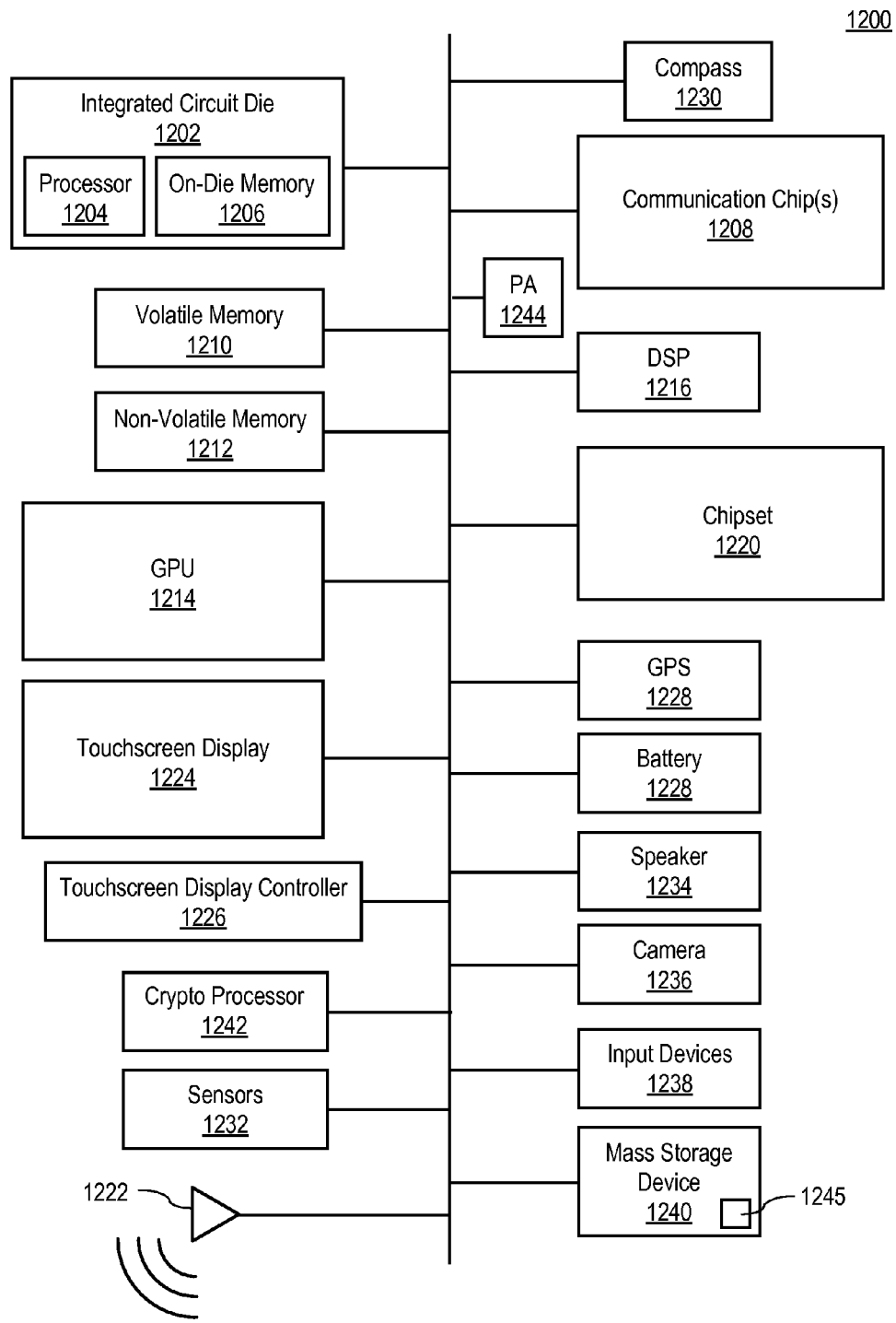
FIG. 12 illustrates a data processing system in accordance with one embodiment.

A node in the HPC system typically has a large number of cores (e.g., about 100 cores, or any other large number of cores) and is often used as a multi-tenancy node. Multiple jobs can share the node using time sharing, or different jobs can run on different cores of the node simultaneously. If the power of a job on a shared node is not considered, this power cannot be dynamically distributed for other resources to get a max performance. The job power monitoring as described herein advantageously increases the system performance. FIG. 12 illustrates a data processing system 1200 in accordance with one embodiment. Data processing system 1200 represents any data processing system to profile a job power, as described herein with respect to FIGS. 1-11. In alternative embodiments, the data processing system 1200 may be connected (e.g., networked) to other machines in a Local Area Network (LAN), an intranet, an extranet, or the Internet. The data processing system 1200 may operate in the capacity of a server or a client machine in a client-server network environment, or as a peer machine in a peer-to-peer (or distributed) network environment.

The data processing system 1200 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that data processing system. Further, while only a single data processing system is illustrated, the term "data processing system" shall also be taken to include any collection of data processing systems that individually or jointly execute a set (or multiple sets) of instructions to perform any one or more of the methodologies described herein.

A processor 1204 represents one or more general-purpose processing devices such as a microprocessor, central processing unit, or other processing device. More particularly, the processor 1204 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1204 may also be one or more special-purpose processing devices such as an application specific integrated circuit (ASIC), a field programmable gate array (FPGA), a digital signal processor (DSP), network processor, or the like. Processor 1204 is configured to control a processing logic for performing the operations described herein with respect to FIGS. 1-11.

The data processing system 1200 may include a number of components. In one embodiment, these components are attached to one or more motherboards. In an alternate embodiment, these components are fabricated onto a single system-on-a-chip (SoC) die rather than a motherboard. The components in the data processing system 1200 include, but are not limited to, an integrated circuit die 1202 and at least one communication chip 1208. In some implementations the communication chip 1208 is fabricated as part of the integrated circuit die 1202. The integrated circuit die 1202 may include processor 1204, an on-die memory 1206, often used as cache memory, that can be provided by technologies such as embedded DRAM (eDRAM) or spin-transfer torque memory (STTM or STTM-RAM).

Data processing system 1200 may include other components that may or may not be physically and electrically coupled to the motherboard or fabricated within an SoC die. These other components include, but are not limited to, a volatile memory 1210 (e.g., DRAM), a non-volatile memory 1212 (e.g., ROM or flash memory), a graphics processing unit 1214 (GPU), a digital signal processor 1216, a crypto processor 1242 (a specialized processor that executes cryptographic algorithms within hardware), a chipset 1220, an antenna 1222, a display or a touchscreen display 1224, a touchscreen controller 1226, a battery 1228 or other power source, a power amplifier (PA) 1244, a global positioning system (GPS) device 1228, a compass 1230, sensors 1232 (that may include one or more power measurement sensor to measure power as described above, and any other sensor), a speaker 1234, a camera 1236, user input devices 1238 (such as a keyboard, mouse, stylus, and touchpad), and a mass storage device 1240 (such as hard disk drive, compact disk (CD), digital versatile disk (DVD), and so forth).

The communications chip 1208 enables wireless communications for the transfer of data to and from the data processing system 1200. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1208 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The data processing system 1200 may include a plurality of communication chips 1208. For instance, a first communication chip 1208 may be dedicated to shorter range wireless communications such as Wi-Fi and Bluetooth and a second communication chip 1208 may be dedicated to longer range wireless communications such as GPS, EDGE, GPRS, CDMA, WiMAX, LTE, Ev-DO, and others. The term "processor" may refer to any device or portion of a device that processes electronic data from registers and/or memory to transform that electronic data into other electronic data that may be stored in registers and/or memory.

In various embodiments, the data processing system 1200 may be a laptop computer, a netbook computer, a notebook computer, an ultrabook computer, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, a digital video recorder, or a part of the HPC system, cloud system, or any other data processing system. In further implementations, the data processing system 1200 may be any other electronic device that processes data.

The mass storage device 1240 may include a machine-accessible storage medium (or more specifically a computer-readable storage medium) 1244 on which is stored one or more sets of instructions (e.g., a software) embodying any one or more of the methodologies or functions described herein. The software may also reside, completely or at least partially, within the memory 1210, memory 1212, memory 1206 and/or within the processor 1204 during execution thereof by the data processing system 1200, the on-die memory 1206 and the processor 1204 also constituting machine-readable storage media. The software may further be transmitted or received over a network via a network interface device.

While the machine-accessible storage medium 1244 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

The following examples pertain to further embodiments:

A method to profile a job power for a data processing system, comprising collecting a process identifier for a job, identifying the job using the process identifier, identifying a node used by the job, and determining a power consumed by the job on the node.

A method to profile a job power for a data processing system, comprising collecting a process identifier for a job, wherein the job runs on a plurality of nodes identifying the job using the process identifier, identifying a node used by the job; and determining a power consumed by the job on the node.

A method to profile a job power for a data processing system, comprising collecting a process identifier for a job, identifying the job using the process identifier; identifying a node used by the job; determining a portion of the node used by the job; determining a start time of the job, determining an end time of the job, and determining a power consumed by the job on the node.

A method to profile a job power for a data processing system, comprising obtaining samples of a process associated with the job, wherein the samples comprise one or more power samples, one or more time samples, or any combination thereof; collecting a process identifier for a job; identifying the job using the process identifier, identifying a node used by the job, and determining a power consumed by the job on the node.

A method to profile a job power for a data processing system, comprising collecting a process identifier for a job, generating a map between the process identifier and a job identifier, identifying the job using the process identifier, identifying a node used by the job, and determining a power consumed by the job on the node.

A method to profile a job power for a data processing system, comprising collecting a process identifier for a job, identifying the job using the process identifier, identifying a node used by the job, identifying a shared resource used by the job, and determining a power consumed by the job on the node.

A method to profile a job power for a data processing system, comprising measuring an amount of power consumed by the node, collecting a process identifier for a job, identifying the job using the process identifier, identifying a node used by the job, and determining a power consumed by the job on the node.

A method to profile a job power for a data processing system, comprising sampling a process for a job running on a plurality of nodes to obtain one or more samples, generating a timestamp for the job to create a log record, and attaching a node identifier to the log record to send to a head node.

A method to profile a job power for a data processing system, comprising sampling a process for a job running on a plurality of nodes to obtain one or more samples, wherein the process is sampled at a predetermined time, wherein the one or more samples comprise one or more power samples, one or more time samples, or any combination thereof, generating a timestamp for the job to create a log record, and attaching a node identifier to the log record to send to a head node.

A method to profile a job power for a data processing system, comprising sampling a process for a job running on a plurality of nodes to obtain one or more samples, a timestamp for the job to create a log record, and attaching a node identifier to the log record to send to a head node, wherein the node identifier attached to the log record is sent to the head node at a predetermined time.

A method to profile a job power for a data processing system, comprising intercepting an access request from a process of the job, sampling a process for a job running on a plurality of nodes to obtain one or more samples, generating a timestamp for the job to create a log record, and attaching a node identifier to the log record to send to a head node.

A method to profile a job power for a data processing system, comprising sampling a process for a job running on a plurality of nodes to obtain one or more samples, identifying a shared resource used by the process, generating a timestamp for the job to create a log record, and attaching a node identifier to the log record to send to a head node.

A non-transitory machine readable medium comprising instructions that cause a data processing system to perform operations comprising collecting a process identifier for a job, identifying the job using the process identifier, identifying a node used by the job, and determining a power consumed by the job on the node.

A non-transitory machine readable medium comprising instructions that cause a data processing system to perform operations comprising collecting a process identifier for a job, identifying the job using the process identifier, identifying a node used by the job, and determining a power consumed by the job on the node, wherein the job runs on a plurality of nodes.

A non-transitory machine readable medium comprising instructions that cause a data processing system to perform operations comprising collecting a process identifier for a job, identifying the job using the process identifier, identifying a node used by the job, determining a portion of the node used by the job, determining a start time of the job, determining an end time of the job, and determining a power consumed by the job on the node.

A non-transitory machine readable medium comprising instructions that cause a data processing system to perform operations comprising obtaining samples of a process associated with the job, wherein the samples comprise one or more power samples, one or more time samples, or any combination thereof, collecting a process identifier for a job, wherein the process is sampled at a predetermined time, identifying the job using the process identifier, identifying a node used by the job, and determining a power consumed by the job on the node.

A non-transitory machine readable medium comprising instructions that cause a data processing system to perform operations comprising collecting a process identifier for a job, generating a map between the process identifier and a job identifier, identifying the job using the process identifier, identifying a node used by the job, and determining a power consumed by the job on the node.

A non-transitory machine readable medium comprising instructions that cause a data processing system to perform operations comprising collecting a process identifier for a job, identifying the job using the process identifier, identifying a node used by the job, identifying a shared resource used by the job, and determining a power consumed by the job on the node.

A non-transitory machine readable medium comprising instructions that cause a data processing system to perform operations comprising measuring an amount of power consumed by the node; collecting a process identifier for a job, identifying the job using the process identifier, identifying a node used by the job, and determining a power consumed by the job on the node.

A data processing system, comprising a memory; and a processor coupled to the memory, wherein the processor is to collect a process identifier for a job, wherein the processor is to identify the job using the process identifier, wherein the processor is to identify a node used by the job; and wherein the processor is to determine a power consumed by the job on the node.

A data processing system, comprising a memory; and a processor coupled to the memory, wherein the processor is to collect a process identifier for a job, wherein the job runs on a plurality of nodes, wherein the processor is to identify the job using the process identifier, wherein the processor is to identify a node used by the job; and wherein the processor is to determine a power consumed by the job on the node.

A data processing system, comprising a memory; and a processor coupled to the memory, wherein the processor is to collect a process identifier for a job, wherein the processor is to identify the job using the process identifier, wherein the processor is to identify a node used by the job, wherein the processor is to determine a portion of the node used by the job, wherein the processor is to determine a start time of the job, wherein the processor is to determine an end time of the job and wherein the processor is to determine a power consumed by the job on the node.

A data processing system, comprising a memory; and a processor coupled to the memory, wherein the processor is to obtain samples of a process associated with the job, wherein the process is sampled at a predetermined time and wherein the samples comprise one or more power samples, one or more time samples, or any combination thereof, wherein the processor is to collect a process identifier for a job, wherein the processor is to identify the job using the process identifier, wherein the processor is to identify a node used by the job; and wherein the processor is to determine a power consumed by the job on the node.

A data processing system, comprising a memory; and a processor coupled to the memory, wherein the processor is to collect a process identifier for a job, wherein the processor is to generate a map between the process identifier and a job identifier, wherein the processor is to identify the job using the process identifier, wherein the processor is to identify a node used by the job; and wherein the processor is to determine a power consumed by the job on the node.

A data processing system, comprising a memory; and a processor coupled to the memory, wherein the processor is to collect a process identifier for a job, wherein the processor is to identify the job using the process identifier, wherein the processor is to identify a node used by the job, wherein the processor is to identify a shared resource used by the job, and wherein the processor is to determine a power consumed by the job on the node.

A data processing system, comprising a memory; and a processor coupled to the memory, wherein the processor is to measure an amount of power consumed by the node, wherein the processor is to collect a process identifier for a job, wherein the processor is to identify the job using the process identifier, wherein the processor is to identify a node used by the job; and wherein the processor is to determine a power consumed by the job on the node.

A non-transitory machine readable medium comprising instructions that cause a data processing system to perform operations comprising sampling a process for a job running on a plurality of nodes to obtain one or more samples, generating a timestamp for the job to create a log record, and attaching a node identifier to the log record to send to a head node.

A non-transitory machine readable medium comprising instructions that cause a data processing system to perform operations comprising sampling a process for a job running on a plurality of nodes to obtain one or more samples, wherein the process is sampled at a predetermined time and wherein the one or more samples comprise one or more power samples, one or more time samples, or any combination thereof; generating a timestamp for the job to create a log record, and attaching a node identifier to the log record to send to a head node.

A non-transitory machine readable medium comprising instructions that cause a data processing system to perform operations comprising sampling a process for a job running on a plurality of nodes to obtain one or more samples, generating a timestamp for the job to create a log record, and attaching a node identifier to the log record to send to a head node, wherein the node identifier attached to the log record is sent to the head node at a predetermined time.

A non-transitory machine readable medium comprising instructions that cause a data processing system to perform operations comprising intercepting an access request from a process of the job, sampling a process for a job running on a plurality of nodes to obtain one or more samples; generating a timestamp for the job to create a log record, and attaching a node identifier to the log record to send to a head node.

A non-transitory machine readable medium comprising instructions that cause a data processing system to perform operations comprising sampling a process for a job running on a plurality of nodes to obtain one or more samples, identifying a shared resource used by the process, generating a timestamp for the job to create a log record, and attaching a node identifier to the log record to send to a head node.

A data processing system comprising a memory, and a processor coupled to the memory, wherein the processor is to sample a process for a job running on a plurality of nodes to obtain one or more samples, wherein the processor is to generate a timestamp for the job to create a log record, and wherein the processor is to attach a node identifier to the log record to send to a head node.

A data processing system comprising a memory, and a processor coupled to the memory, wherein the processor is to sample a process for a job running on a plurality of nodes to obtain one or more samples, wherein the process is sampled at a predetermined time, wherein the one or more samples comprise one or more power samples, one or more time samples, or any combination thereof, wherein the processor is to generate a timestamp for the job to create a log record, and wherein the processor is to attach a node identifier to the log record to send to a head node.

A data processing system comprising a memory, and a processor coupled to the memory, wherein the processor is to sample a process for a job running on a plurality of nodes to obtain one or more samples, wherein the processor is to generate a timestamp for the job, to create a log record, and wherein the processor is to attach a node identifier to the log record to send to a head node, wherein the node identifier attached to the log record is sent to the head node at a predetermined time.

A data processing system, comprising a memory, and a processor coupled to the memory, wherein the processor is to intercept an access request from a process of the job, wherein the processor is to sample a process for a job running on a plurality of nodes to obtain one or more samples, wherein the processor is to generate a timestamp for the job to create a log record, and wherein the processor is to attach a node identifier to the log record to send to a head node.

A data processing system comprising a memory, and a processor coupled to the memory, wherein the processor is to sample a process for a job running on a plurality of nodes to obtain one or more samples, wherein the processor is to identify a shared resource used by the process, wherein the processor is to generate a timestamp for the job to create a log record, and wherein the processor is to attach a node identifier to the log record to send to a head node.

A method to account for power of shared jobs on shared nodes comprising establishing a power for a unit of a shared node for a job, measuring a bandwidth of the shared node for the job, and determining a power portion consumed by the job on the shared node using at least one of the established power or the measured bandwidth.

A method to account for power of shared jobs on shared nodes comprising establishing a power for a unit of a shared node for a job, measuring a bandwidth of the shared node for the job, and determining a power portion consumed by the job on the shared node using at least one of the established power or the measured bandwidth, and determining a total power consumed by the job.

A method to account for power of shared jobs on shared nodes comprising establishing a power for a unit of a shared node for a job, measuring a bandwidth of the shared node for the job, and determining a power portion consumed by the job on the shared node using at least one of the established power or the measured bandwidth, wherein the shared node comprises an IO node, an OS node, or a compute node.

A method to account for power of shared jobs on shared nodes comprising establishing a power for a unit of a shared node for a job, measuring a bandwidth of the shared node for the job, and determining a power portion consumed by the job on the shared node using at least one of the established power or the measured bandwidth, wherein the established power indicates a portion of power needed for the shared node to transfer a predetermined amount of data.

A method to account for power of shared jobs on shared nodes comprising establishing a power for a unit of a shared node for a job, measuring a bandwidth of the shared node for the job, and determining a power portion consumed by the job on the shared node using at least one of the established power or the measured bandwidth, wherein the bandwidth indicates a portion of the network traffic occupied by the job.

A method to account for power of shared jobs on shared nodes comprising a) establishing a power for a unit of a shared node for a job, b) measuring a bandwidth of the shared node for the job, and d) determining a power portion consumed by the job on the shared node using at least one of the established power or the measured bandwidth, wherein the shared node is one of a plurality of shared nodes, and wherein operations a) b) and c) are performed for each of the plurality of shared nodes, and summarizing the power portions consumed by the job on each of the plurality of shared nodes to determine a total power consumed by the job.

A method to account for power of jobs on a shared node comprising measuring an average power consumed over a time unit for a node, measuring a usage time of the node by a process of a job; and calculating a power consumed by the process on the shared node based on the average power and the usage time.

A method to account for power of jobs on a shared node comprising measuring an average power consumed over a time unit for a node, measuring a usage time of the node by a process of a job; and calculating a power consumed by the process on the shared node based on the average power and the usage time, wherein the shared node is a compute node, an IO node, or an OS node.

A method to account for power of jobs on a shared node comprising measuring an average power consumed over a time unit for a node, measuring a usage time of the node by a process, the process being one of a plurality of processes that run on the node; and calculating a power consumed by the process on the shared node based on the average power and the usage time, wherein the calculating comprises dividing the measured average power according to the usage time of the node by each of the processes.

A method to account for power of jobs on a shared node comprising measuring an average power consumed over a time unit for a node, measuring a usage time of the node by a process of a job, wherein the usage time is stamped using a timer, and calculating a power consumed by the process on the shared node based on the average power and the usage time.

A method to account for power of jobs on a shared node comprising a plurality of cores, the method comprising measuring an amount of power consumed by the node, determining a number of cores used by a process, and determining a power consumed by the process based on the number of cores.

A method to account for power of jobs on a shared node comprising measuring an amount of power consumed by the node, determining a number of cores used by a process, wherein the process is sampled at a predetermined time, and determining a power consumed by the process based on the number of cores, wherein the power consumed by the process is determined for every sample of the process.

A method to account for power of jobs on a shared node, comprising measuring an amount of power consumed by the node, determining a number of cores used by a process, and determining a power consumed by the process based on the number of cores, wherein the determining the power comprises dividing the measured power consumed by the node based on the number of cores.

A method to account for power of jobs on a shared node comprising a) measuring an amount of power consumed by the node, b) determining a number of cores used by a process, the process being one of a plurality of processes running on the shared node, and c) determining a power consumed by the process based on the number of cores, wherein operations b) and c) are performed for each of the plurality of processes.

A method to account for power of jobs on a shared node comprising measuring an amount of power consumed by the node, wherein the node comprises a plurality of cores, determining an actual core power used by each of the cores; determining a number of cores used by the process, and determining a power consumed by the process based on the number of cores using the actual core power.

In the foregoing specification, methods and apparatuses have been described with reference to specific exemplary embodiments thereof. It will be evident that various modifications may be made thereto without departing from the broader spirit and scope of embodiments as set forth in the following claims. The specification and drawings are, accordingly, to be regarded in an illustrative sense rather than a restrictive sense.

What is claimed is:

1. A method to profile a job power performed on a data processing system comprising a plurality of shared nodes and a controller node, comprising:
collecting, using the controller node, a plurality of process identifiers sent from the plurality of shared nodes;
determining, using the controller node, identifiers for a plurality of jobs including a first job and a second job based on the plurality of process identifiers, wherein a job is a computer program that is executed on at least a portion of the plurality of shared nodes;
identifying, using the controller node, the shared nodes including a first shared node and a second shared node that are used to execute the plurality of jobs based on the job identifiers, wherein a table is generated that includes a number of accesses of the first shared node by the first job and a number of accesses of the first shared node by the second job;
and
calculating, using the controller node, an amount of power consumed by the first shared node to execute the first job, an amount of power consumed by the first shared node to execute the second job, and an amount of power consumed by the second shared node to execute the first job based on the number of accesses to control the job power to increase performance and throughput within power limits of the system.

2. The method of claim 1, further comprising
determining a start time of the job; and
determining an end time of the job.

3. The method of claim 1, further comprising
obtaining samples of a process associated with the job, wherein the samples comprise one or more power samples, one or more time samples, or any combination thereof.

4. The method of claim 1, further comprising
generating a map between the process identifiers and the job identifiers.

5. The method of claim 1, further comprising
identifying a shared resource used by the job.

6. The method of claim 1, further comprising
measuring the amount of power consumed by each of the shared nodes.

7. A method to profile a job power for a data processing system comprising a plurality of shared nodes and a head node, comprising:
sampling a plurality of processes for a plurality of jobs including a first job and a second job running on at least a portion of the plurality of shared nodes including a first shared node and a second shared node to obtain one or more samples;
generating, a timestamp for each of the first job and the second job to create a log record comprising the one or more samples indicating a number of accesses of the first shared node by the first job and a number of accesses of the first shared node by the second job;
attaching a node identifier to the log record; and
sending the node identifier with the log record to the head node to calculate an amount of power consumed by the jobs to control the job power to increase performance and throughput within power limits of the system, wherein the sampling, generating, attaching and sending are performed by each of the first shared node and the second shared node.

8. The method of claim 7, wherein the process is sampled at a predetermined time and wherein the one or more samples comprise one or more power samples, one or more time samples, or any combination thereof.

9. The method of claim 7, wherein the node identifier attached to the log record is sent to the head node at a predetermined time.

10. The method of claim 7, further comprising
intercepting an access request from the process of the job.

11. The method of claim 7, further comprising
identifying a shared resource used by the process.

12. A non-transitory machine readable medium comprising
instructions that cause a data processing system comprising a plurality of shared nodes and a controller node to perform operations comprising:
collecting, using the controller node, a plurality of process identifiers sent from the plurality of shared nodes;
determining, using the controller node, identifiers for a plurality of jobs including a first job and a second job based on the plurality of process identifiers, wherein a job is a computer program that is executed on at least a portion of the plurality of shared nodes;
identifying, using the controller node, the shared nodes including a first shared node and a second shared node that are used to execute the plurality of jobs based on the job identifiers, wherein a table is generated that includes a number of accesses of the first shared node by the first job and a number of accesses of the first shared node by the second job; and
calculating, using the controller node, an amount of power consumed by the first shared node to execute the first job, an amount of power consumed by the first shared node to execute the second job, and an amount of power consumed by the second shared node to execute the first job based on the number of accesses to control a job power to increase performance and throughput within power limits of the system.

13. The non-transitory machine readable medium of claim 12, further comprising instructions that cause the data processing system to perform operations comprising
determining a start time of the job; and
determining an end time of the job.

14. The non-transitory machine readable medium of claim 12, further comprising instructions that cause the data processing system to perform operations comprising
obtaining samples of a process associated with the job, wherein the samples comprise one or power samples, one or more time samples, or any combination thereof.

15. The non-transitory machine readable medium of claim 12, further comprising instructions that cause the data processing system to perform operations comprising
generating a map between the process identifiers and the job identifiers.

16. The non-transitory machine readable medium of claim 12, further comprising instructions that cause the data processing system to perform operations comprising
identifying a shared resource used by the job.

17. The non-transitory machine readable medium of claim 12, further comprising instructions that cause the data processing system to perform operations comprising
measuring an amount of power consumed by each of the shared nodes.

18. A data processing system, comprising:
a plurality of shared nodes;
a controller node coupled to the plurality of shared nodes;
a memory coupled to the controller node; and the controller node comprising a processor, wherein the processor is configured to collect a plurality of process identifiers sent from the plurality of shared nodes, wherein the processor is configured to determine identifiers for a plurality of jobs including a first job and a second job based on the plurality of process identifiers, wherein a job is a computer program that is executed on at least a portion of the plurality of shared nodes, wherein the processor is configured to identify the shared nodes including a first shared node and a second shared node that are used to execute the plurality of jobs based on the job identifiers, wherein a table is generated that includes a number of accesses of the first shared node by the first job and a number of accesses of the first shared node by the second job; and wherein the processor is configured to calculate an amount of power consumed by the first shared node to execute the first job, an amount of power consumed by the first shared node to execute the second job and an amount of power consumed by the second shared node to execute the first job based on the number of accesses to control a job power to increase performance and throughput within power limits of the system.

19. The data processing system of claim 18, wherein the processor is further configured to determine a start time of the job; and wherein the processor is further configured to determine an end time of the job.

20. The data processing system of claim 18, wherein the processor is further configured to obtain samples of a process associated with the job, wherein the samples comprise one or more power samples, one or more time samples, or any combination thereof.

21. The data processing system of claim 18, wherein the processor is further configured to generate a map between the process identifiers and the job identifiers.

22. The data processing system of claim 18, wherein the processor is further configured to identify a shared resource used by the job.

* * * * *